(12) United States Patent
Kashiwai et al.

(10) Patent No.: US 11,851,130 B2
(45) Date of Patent: Dec. 26, 2023

(54) VEHICLE

(71) Applicant: Honda Motor Co., Ltd., Tokyo (JP)

(72) Inventors: Mikio Kashiwai, Wako (JP); Yotaro Mori, Wako (JP); Tadahiro Yaguchi, Wako (JP); Yuichi Yokoyama, Wako (JP); Tomohiro Tsukamoto, Wako (JP); Nobuo Kambara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/792,379

(22) PCT Filed: Jan. 14, 2021

(86) PCT No.: PCT/JP2021/000937
§ 371 (c)(1),
(2) Date: Jul. 12, 2022

(87) PCT Pub. No.: WO2021/145351
PCT Pub. Date: Jul. 22, 2021

(65) Prior Publication Data
US 2023/0052127 A1 Feb. 16, 2023

(30) Foreign Application Priority Data
Jan. 16, 2020 (JP) .................................. 2020-004838

(51) Int. Cl.
*B62K 5/027* (2013.01)
*B62K 5/05* (2013.01)
(Continued)

(52) U.S. Cl.
CPC ............ *B62K 5/027* (2013.01); *B62D 61/065* (2013.01); *B62K 5/05* (2013.01); *B62K 5/10* (2013.01);
(Continued)

(58) Field of Classification Search
CPC . B62K 5/027; B62K 5/05; B62K 5/10; B62K 5/06; B62K 5/02; B62K 5/023;
(Continued)

(56) References Cited

U.S. PATENT DOCUMENTS 4,560,026 A * 12/1985 Yanagisawa ............. B62H 5/06
180/287
5,551,719 A 9/1996 Rettger, Jr.

FOREIGN PATENT DOCUMENTS

JP H0539073 A 2/1993
JP 2006062573 A 3/2006
(Continued)

*Primary Examiner* — Keith J Frisby
(74) *Attorney, Agent, or Firm* — Duft & Bornsen, PC

(57) ABSTRACT

A vehicle including a first member rotatably supporting a rear wheel, a second member disposed in front of the first member, and a coupling member disposed between the first member and the second member and fixed to the first member and the second member to support the first member and the second member swingably in a left-right direction about an axial line in a front-rear direction. The coupling member is provided so that a position of the post-swing ground contact point is closer to the axial line than a position of the post-swing ground contact point in the left-right direction before the first member swings, the ground contact point being a center in an area on a surface of the rear wheel in contact with a road surface, the post-swing ground contact point being the ground contact point after the first member swings about the axial line.

26 Claims, 22 Drawing Sheets

(51) Int. Cl.
*B62K 5/10* (2013.01)
*B62D 61/06* (2006.01)

(52) U.S. Cl.
CPC ..... *B60Y 2200/122* (2013.01); *B62K 2202/00* (2013.01); *B62K 2204/00* (2013.01)

(58) Field of Classification Search
CPC ................ B62K 5/025; B62K 2202/00; B62K 2204/00; B62D 61/06; B62D 61/065; B62D 61/08; B62D 9/02; B62D 9/04; B60Y 2200/12; B60Y 2200/122
USPC .............. 180/210; 280/124.103, 124.111, 62
See application file for complete search history.

(56) References Cited

FOREIGN PATENT DOCUMENTS

| | | | | |
|---|---|---|---|---|
| JP | 2017154685 | A | * | 9/2017 |
| JP | 2017154685 | A | | 9/2017 |
| JP | 2019010939 | A | | 1/2019 |
| JP | 2019031149 | A | | 2/2019 |

* cited by examiner

VEHICLE

CROSS-REFERENCE TO RELATED APPLICATION

This application is a National Stage of PCT international application Ser. No. PCT/JP2021/000937 filed on Jan. 14, 2021 which designates the United States, incorporated herein by reference, and which is based upon and claims the benefit of priority from Japanese Patent Application No. 2020-004838, filed on Jan. 16, 2020, the entire contents of which are incorporated herein by reference.

TECHNICAL FIELD

This invention relates to a vehicle so as to be capable of swinging in a left-right direction.

BACKGROUND ART

As an apparatus of this type, conventionally, a three wheeled vehicle with one front wheel and two rear wheels has been known in which the front wheel is swingably supported with respect to the rear wheels via a swing axis extending in the front-rear direction and diagonally downward (for example, see Patent Literature 1). Also, a three wheeled vehicle with two front wheels and one rear wheel has been known in which the rear wheel is supported at the rear end of the frame, swingably in the left-right direction by using the frame extending in the front-rear direction as a swing axis, according to the operation of the handle (for example, see Patent Literature 2).

CITATION LIST

Patent Literature

Patent Literature 1: Japanese Unexamined Patent Publication No. H5-39073
Patent Literature 2: Japanese Unexamined Patent Publication No. 2006-62573

DISCL0SURE OF INVENTION

Problems to be Solved by the Invention

However, in the vehicle described in Patent Literature 1, it is difficult to sufficiently improve the turning performance of the vehicle because the rear wheels do not swing. In the vehicle described in Patent Literature 2, when the rear wheel swings, the ground contact point of the rear wheel is shifted from the swing axis in the left-right direction, and there is room for improvement in the turning performance of the vehicle.

Means for Solving Problem

An aspect of the present invention is a vehicle including: a front wheel; a rear wheel; a first member that rotatably supports the rear wheel; a second member disposed in front of the first member; and a coupling member disposed between the first member and the second member and fixed to each of the first member and the second member so as to support the first member and the second member swingably relative to each other in a left-right direction about an axial line extending in a front-rear direction. The coupling member is provided so that in a case where a ground contact point is set to a center in an area on a surface of the rear wheel in contact with a road surface and the ground contact point after the first member swings about the axial line is defined as a post-swing ground contact point, a position in the left-right direction of the post-swing ground contact point is closer to the axial line than a position in the left-right direction of the post-swing ground contact point before the first member swings.

Effect of the Invention

According to the present invention, it is possible to improve a turning performance of a vehicle.

DESCRIPTION OF EMBODIMENT

Figure 1A:
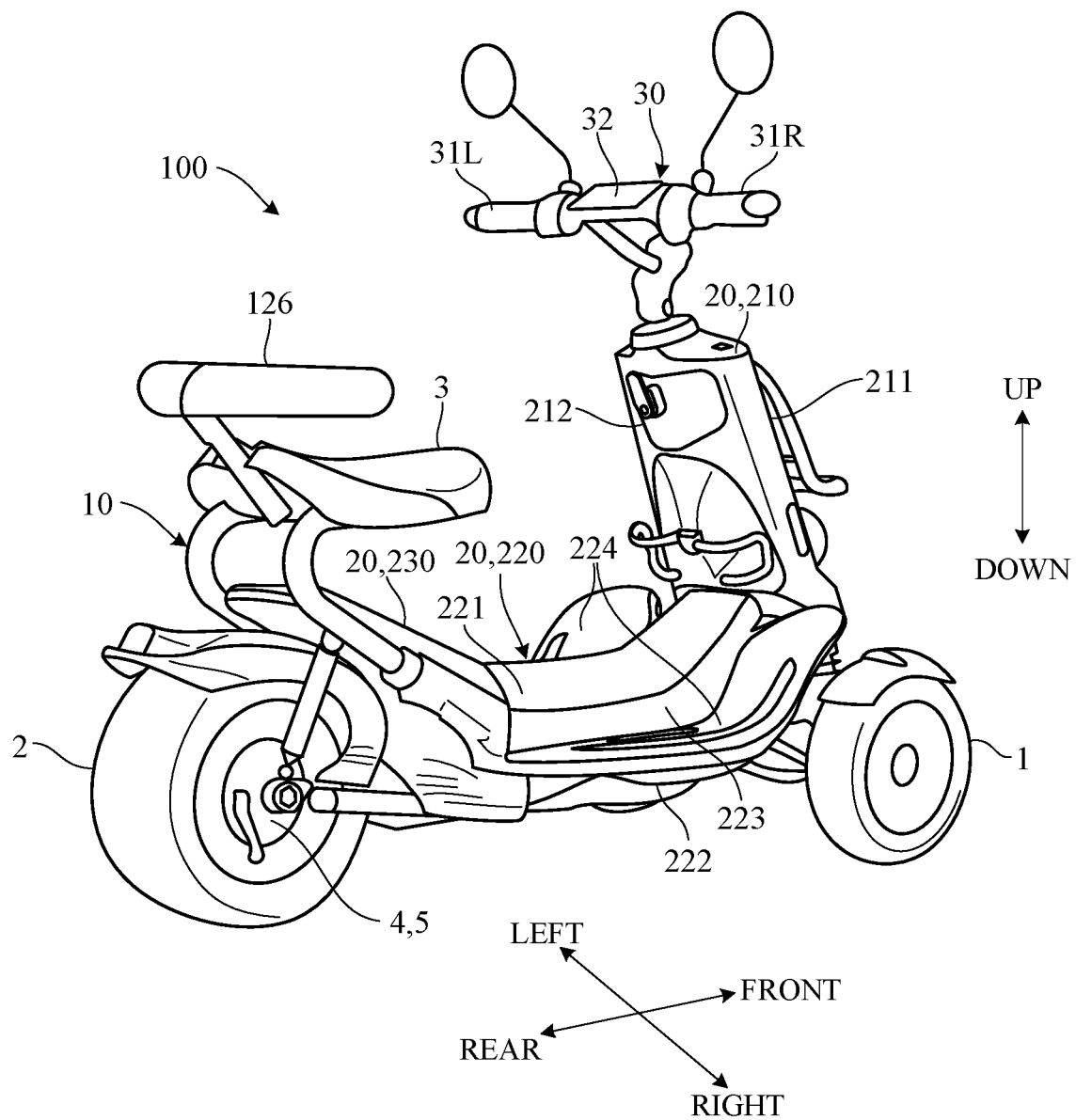
FIG. 1A is a perspective view illustrating an entire configuration of a vehicle according to an embodiment of the present invention.
Figure 1B:
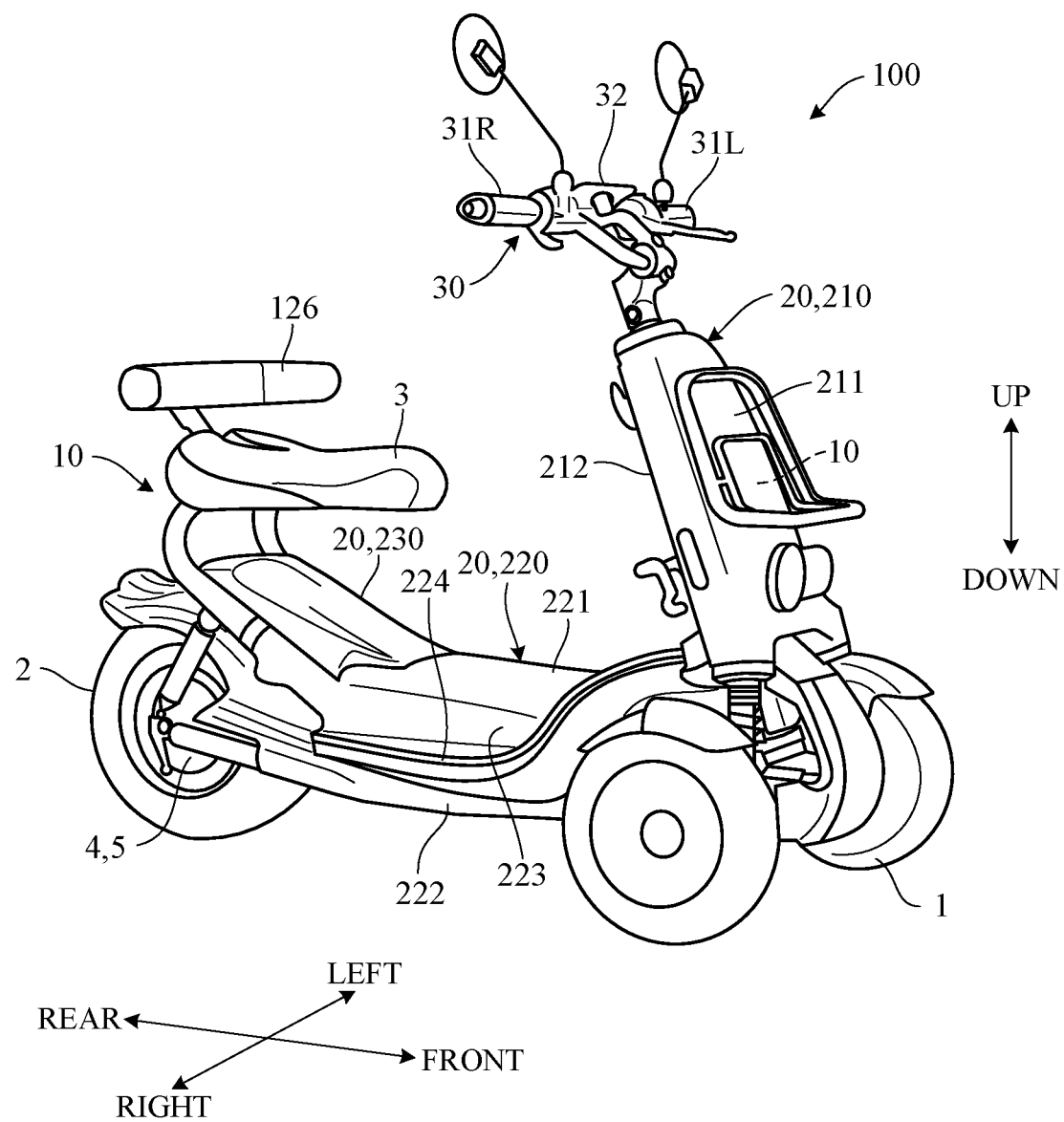
FIG. 1B is a perspective view illustrating an entire configuration of the electric vehicle according to the embodiment of the present invention, viewed from a different direction from FIG. 1A.
Figure 2:
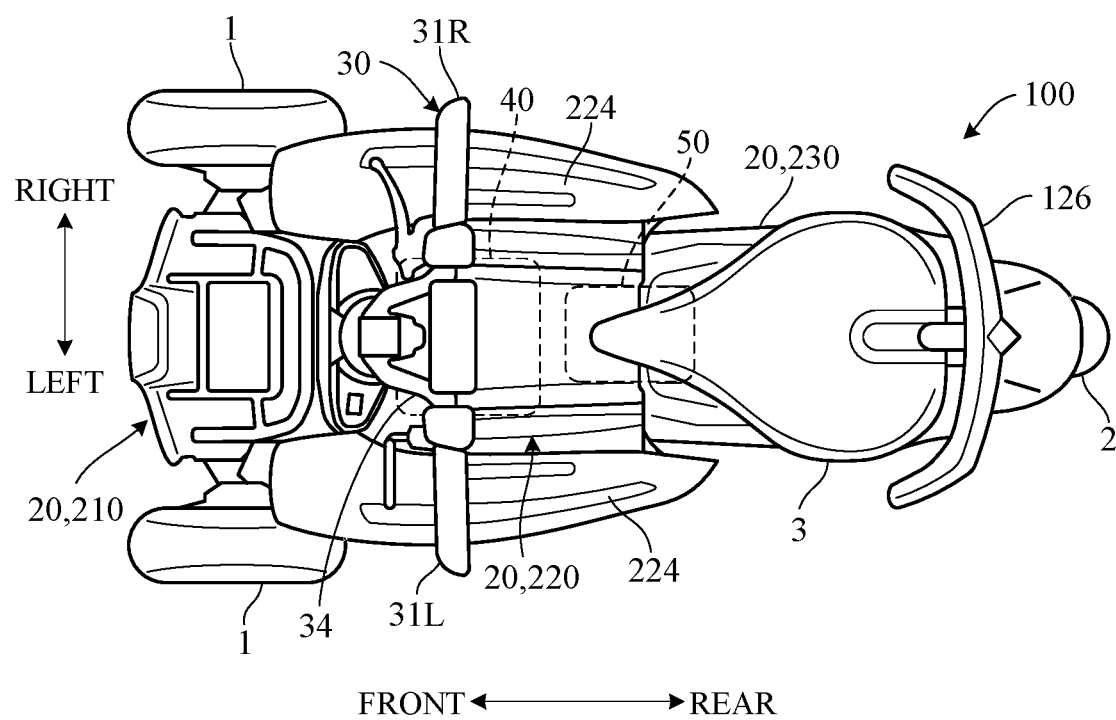
FIG. 2 is a plan view illustrating an entire configuration of the vehicle according to the embodiment of the present invention.

Hereinafter, embodiments of the present invention will be described with reference to FIGS. 1A to 16C. FIG. 1A and FIG. 1B are perspective views each illustrating an entire configuration of a vehicle (hereinafter, may also be referred to as a swingable vehicle) 100 according to an embodiment of the present invention, and FIG. 2 is a plan view. This swingable vehicle is configured as a single-passenger electric vehicle capable of standing by itself in a stopped state. The front side of the vehicle 100 is not swingable, and thus unsteadiness at a low speed can be suppressed, and a slip rollover can be suppressed. Therefore, it is possible to use the vehicle as personal mobility, by loading baggage onto the front vehicle body that is not swingable. Note that it is possible to use the vehicle as a commercial vehicle for the purpose of carrying various types of baggage.

Hereinafter, for the sake of convenience, a front-rear direction, a left-right direction, and an up-down direction are defined as illustrated in the drawings, and the configuration of each part will be described in accordance with the definition. The front-rear direction is a lengthwise direction of the vehicle 100, the left-right direction is a vehicle width direction, and the up-down direction is a gravity direction. When the vehicle 100 is located on a horizontal plane, the up-down direction corresponds to a height direction of the vehicle 100. FIG. 1A is a perspective view of a vehicle 100, when viewed from an obliquely right rear side, and FIG. 1B is a perspective view, when viewed from an obliquely right front side.

As illustrated in FIGS. 1A, 1B, and 2, the vehicle 100 is configured as a three-wheeled vehicle including two front wheels 1 and one rear wheel 2, with the rear wheel 2 serving as a driving wheel. In addition to the front wheels 1 and the rear wheel 2, the vehicle 100 mainly includes a frame 10, which forms a skeleton of the vehicle 100, a cover 20, which covers a periphery of the frame 10, a handlebar 30, which is operated by a user (driver), and a seat 3, on which the user is seated. Its entirety is configured to be substantially left-right symmetric. The frame 10 is made of a high-strength metal, whereas the cover 20 is made of a resin material. The configuration of the frame 10 will be described later.

The cover 20 broadly includes a front cover 210 extending in the up-down direction below the handlebar 30, a floor cover 220 extending in the front-rear direction on a rear side of the front cover 210, and a rear cover 230 extending obliquely rearward on a rear side of the floor cover 220.

The front cover 210 includes a pair of front and rear covers, that is to say, a front surface cover 211 and a rear surface cover 212, which are configured to sandwich in the front-rear direction the frame 10 (a front frame 14 to be described later) extending from the vicinity of the front wheels 1 to the vicinity of the handlebar 30. The front surface cover 211 and the rear surface cover 212 both extend in the left-right direction and the up-down direction, and each of them is formed in a substantially rectangular shape as a whole. The front surface cover 211 and the rear surface cover 212 are integrally coupled with each other by use of fastening means such as bolts, and thus constitute the front cover 210. A light or the like is attached to the front surface cover 211, and a drink holder or the like is provided on the rear surface cover 212.

The floor cover 220 includes a pair of upper and lower covers, that is to say, a top surface cover 221 and a bottom surface cover 222, which are configured to sandwich in the up-down direction the frame 10 (side frames 11 to be described later) extending in the front-rear direction between the front wheels 1 and the rear wheel 2. The top surface cover 221 and the bottom surface cover 222 both extend in the left-right direction and the front-rear direction. A bulging portion 223, which bulges upward, is provided at a central portion in the left-right direction of the top surface cover 221, and steps 224 as placement portions, on which a user seated on the seat 3 places his/her own feet, are respectively provided on both sides in the left-right direction of the bulging portion 223. A front end portion of the step 224 extends obliquely upward so as not to interfere with the front wheel 1. The top surface cover 221 and the bottom surface cover 222 are integrally coupled with each other by use of fastening means such as bolts, and thus constitute the floor cover 220.

The rear cover 230 is configured to cover the frame 10 (seat frames 12 to be described later) extending rearward and obliquely upward toward the seat 3. Electric component parts, such as an electric power control unit, are stored inside the rear cover 230.

The seat 3 is located above and on a front side of (on an obliquely upper side of) the rear wheel 2, and is formed to be elongated in the front-rear direction so that the width becomes narrower toward the front side. The handlebar 30 extends in the left-right direction substantially above the front wheels 1 (strictly, above and slightly on a rear side of the handlebar 30). The seat 3 is a riding support portion for supporting the user's buttocks. The user rides on the vehicle 100, while being seated on the seat 3, in a posture of holding the handlebar 30 with both hands and placing both feet on the left and right steps 224 on the top surface cover 221.

A traveling motor 4 (in-wheel motor) to be driven by the electric power supplied from a battery 40 (FIG. 3) and a brake unit 5 are accommodated inside the rear wheel 2. For example, the traveling motor 4 is disposed on the left side, and the brake unit 5 is disposed on the right side. The brake unit 5 is configured as, for example, a drum brake unit that constitutes a drum brake. The vehicle 100 travels with the traveling motor 4 being driven, and braking force is applied by regeneration of the traveling motor 4, electromagnetic brake, drum brake activation by manual operation, and the like.

Grips 31L and 31R to be gripped by the user are respectively provided at both left and right end portions of the handlebar 30, and a display unit 32, which displays vehicle information such as a remaining battery capacity and a set vehicle speed, is provided between the left and right grips 31L and 31R. In the vicinity of the grips 31L and 31R, various switches such as a starter switch for instructing on and off of the main power supply, a traveling forward and rearward changeover switch for instructing switching between traveling forward and rearward, a blinker switch for instructing a left or right turn, a speed setting switch for setting the maximum vehicle speed, and a horn switch for instructing activation of the horn are provided so as to be operable by the user.

Furthermore, in the vicinity of the grips 31L and 31R, an accelerator lever for inputting a travel instruction, a brake lever for instructing the activation of the brake, and the like are provided so as to be operable by the user.

Figure 3:
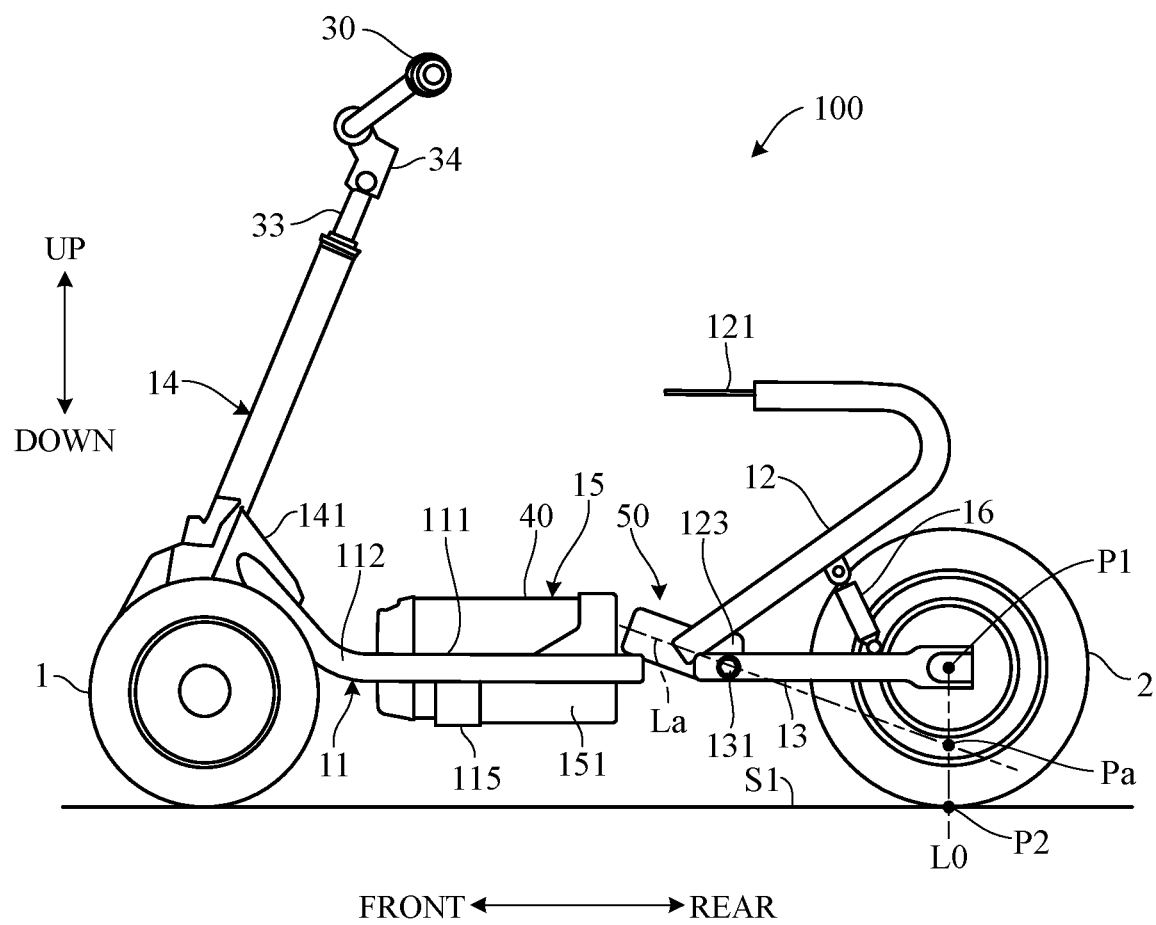
FIG. 3 is a side view of the vehicle illustrating a state in which a seat, cover, etc. are removed from the vehicle according to the embodiment of the present invention.

FIG. 3 is a side view of the vehicle 100 illustrating a state in which the seat 3, the cover 20, and various component parts provided on the handlebar 30 are removed from the vehicle 100, and mainly illustrates a configuration of the frame 10. As illustrated in FIG. 3, the frame 10 includes a pair of left and right (only one of them is illustrated) side frames 11 disposed at a central part in the front-rear direction of the vehicle 100, seat frames 12 disposed on a rear side of the side frames 11, a pair of left and right (only one of them is illustrated) swing arms 13 extending in the front-rear direction below the seat frames 12, and a front frame 14 extending upward from a front end portion of the side frames 11, and the entire frame is formed to be left-right symmetric.

The left and right side frames 11 are each formed of, for example, a pipe member having a substantially circular cross-section. The left and right side frames 11 each include a horizontal portion 111 extending substantially horizontally in the front-rear direction, a front inclined portion 112 bent from a front end portion of the horizontal portion 111 and extending inward in the left-right direction and obliquely upward, and a coupling portion 113 extending in the left-right direction and coupling rear end portions of the left and right horizontal portions 111. A bracket 141 is provided on a lower end portion of the front frame 14 so as to protrude rearward, and front end portions of the left and right front inclined portions 112 are respectively fixed to left and right side surfaces of the bracket 141 by welding or the like.

The vehicle 100 is provided with a battery accommodation portion 15. The battery 40 has a predetermined length, width, and height, and is formed in a substantially rectangular parallelepiped shape as a whole. The battery 40 is accommodated in the battery accommodation portion 15, which is a space between the left and right side frames 11, more specifically, an accommodation space on an inner side of the left and right horizontal portions 111. Specifically, the battery 40 is accommodated to be laid down as illustrated.

The battery accommodation portion 15 includes a holder 151, which surrounds the battery 40, and a support frame 115, which supports the battery 40 via the holder 151. The support frame 115 is formed in a substantially letter U shape, when viewed from the front side, and both left and right end portions of the support frame 115 are respectively fixed to the horizontal portions 111 of the left and right side frames 11.

Although not illustrated, the holder 151 is supported by the side frame 11 to be capable of turning in the up-down direction. The battery 40 is in a horizontal posture as illustrated at the time of traveling. However, at the time of attachment or detachment, the holder 151 is turned and the battery 40 is to be in an inclined posture with an upward gradient toward the front side.

The seat frames 12 include, for example, a pair of left and right pipe members each having a substantially circular cross-section. The seat frames 12 extend obliquely upward from their front end portion toward the rear side, are bent forward and inward in the left-right direction above the rear wheel 2 (above the rotation center), and are then integrally connected through a connection portion 121. The seat 3 is attached onto an upper side of the connection portion 121 of the seat frames 12. Brackets 123 are respectively fixed to lower end portions of left and right seat frames 12. As illustrated in FIGS. 1A and 1B, a guide 126 as an occupant support portion for supporting the user's buttocks and lumbar part is attached on a rear side of the seat 3.

Front end portions of the left and right swing arms 13 are pivotally supported onto the brackets 123 so as to be respectively pivotable with a pair of left and right pivot shafts 131 extending in the left-right direction, as fulcrums. Rear end portions of the left and right swing arms 13 are rotatably connected with both end portions in the left-right direction of the rotation shaft of the rear wheel 2. Impact absorbing units 16 each having a coil spring or the like are interposed respectively between the left and right seat frames 12 and between the left and right swing arms 13.

A lower end portion of the front frame 14 is fixed to the bracket 141, and the front frame 14 extends upward and rearward (obliquely rearward) from the lower end portion. At the lower end portion of the front frame 14, a support frame is provided to protrude in the left-right direction, and the left and right front wheels 1 are rotatably supported by the support frame. The front frame 14 is formed in a pipe shape, and a steering shaft 33 is rotatably inserted into the front frame 14. A stem 34 is attached onto an upper end portion of the steering shaft 33 with a bolt. The stem 34 is bent upward and forward in a substantially letter L shape in a side view, and the handlebar 30 is fixed to the steering shaft 33 through the stem 34. When the handlebar 30 is operated to turn to the left or right, its operation force is transmitted through a tie rod, a knuckle, a king pin, and the like, which are not illustrated, to the left and right front wheels 1. Accordingly, the left and right front wheels 1 are steered, and the vehicle 100 can be made to turn to the left or right.

As a characteristic configuration in the present embodiment, a swing joint 50 is disposed between the side frames 11 and the swing arms 13 for supporting the rear wheel 2 and between the side frames 11 and the seat frames 12. The side frames 11, the seat frames 12, and the swing arms 13 are coupled through the swing joint 50. Specifically, rear end portions of the side frames 11, and front end portions of the seat frames 12 and the swing arms 13 are respectively fixed to a front end portion and a rear end portion of the swing joint 50. The rear end portion of the swing joint 50 is configured to be rotatable about an axial line La with respect to the front end portion, so that the rear wheel 2 side is capable of swinging in the left-right direction with respect to the side frames 11. Hereinafter, the side frames 11 and the like on the front side of the swing joint 50 will be referred to as a front vehicle body, whereas the seat frames 12, the swing arms 13, and the like on the rear side of the swing joint 50 will be referred to as a rear vehicle body, in some cases.

The swing joint 50 extends in the front-rear direction along a center line (vehicle center line) passing through the center in the left-right direction of the vehicle 100. More specifically, an axial line La passing through the center of the swing joint 50 (a shaft portion 52 to be described later), that is, a swing axis extends in the front-rear direction along the vehicle center line with a downward gradient toward the rear side. FIG. 3 is a view illustrating a state before the rear wheel 2 swings, and an intersection of a perpendicular line L0 drawn from a rotation center P1 of the rear wheel 2 to a road surface S1 and the road surface Si is a ground contact point P2 before swinging. An intersection Pa of the axial line La and the perpendicular line L0 is located above the ground contact point P2 and below the rotation center P1. The configuration of the swing joint 50 will be described later. The pair of left and right front wheels 1 are not swingable. Therefore, the vehicle 100 is capable of standing by itself, when stopped, and it is possible to suppress a slip-induced rollover of the front wheels on a slippery road surface. In addition, the unsteadiness of the vehicle 100 during low-speed traveling is suppressed, and the stability of the vehicle 100 is high.

Figure 4:
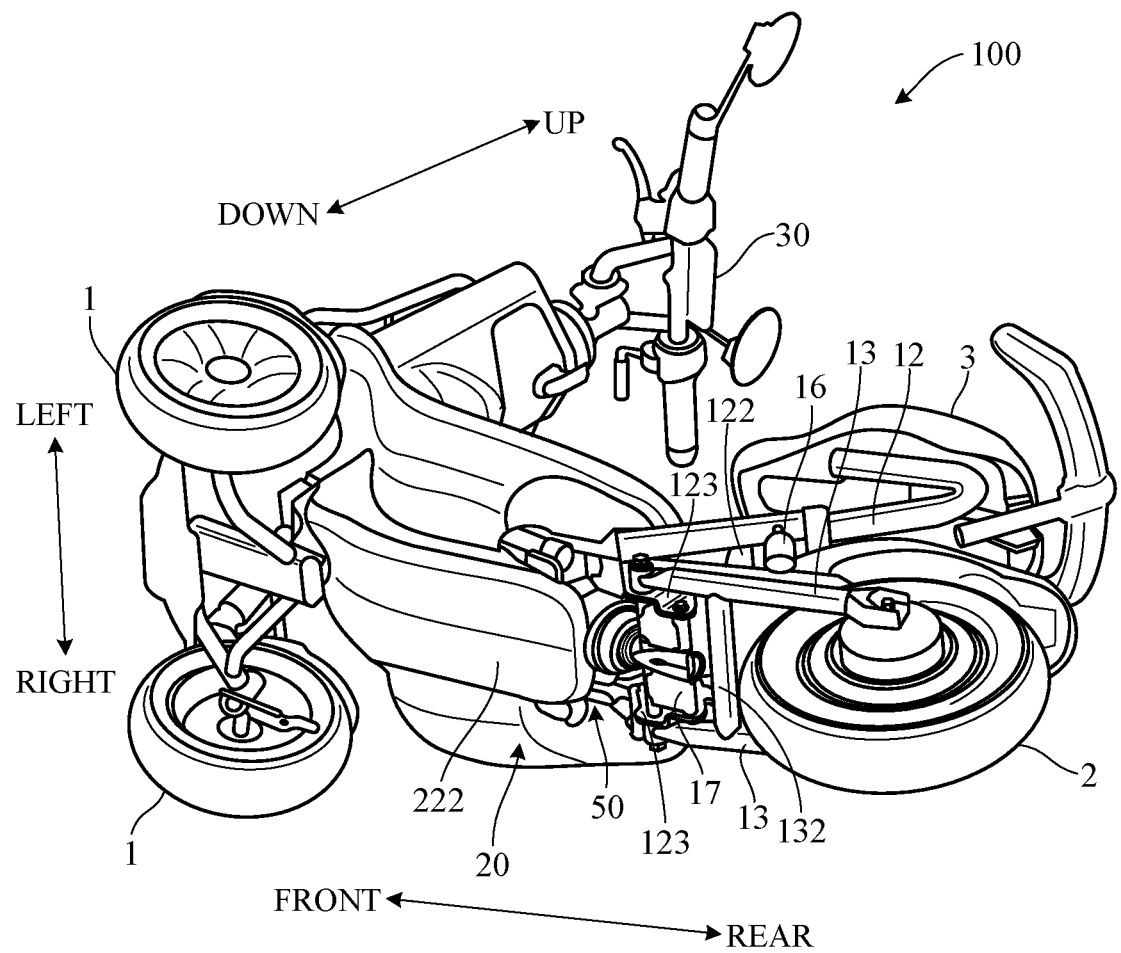
FIG. 4 is a perspective view of the vehicle according to the embodiment of the present invention, when viewed obliquely from below.

FIG. 4 is a perspective view of the vehicle 100, when viewed obliquely from below. As illustrated in FIG. 4, the left and right swing arms 13 are coupled integrally with each other through a coupling frame 132 in a pipe shape extending in the left-right direction on a front side of the rear wheel 2. A coupling frame 122 in a pipe shape extending in the left-right direction is provided above the coupling frame 132 (see FIG. 5), and the left and right seat frames 12 are coupled integrally with each other through the coupling frame 122. The left and right brackets 123 on a front side of the coupling frame 132 are coupled integrally with each other through a coupling plate 17 in a substantially rectangular shape that extends in the left-right direction. The coupling plate 17 is provided to be inclined rearward and downward along the axial line La, and the rear end portion of the swing joint 50 is attached to a front end portion of the coupling plate 17. The front side of the swing joint 50 is disposed above the bottom surface cover 222.

Figure 5:
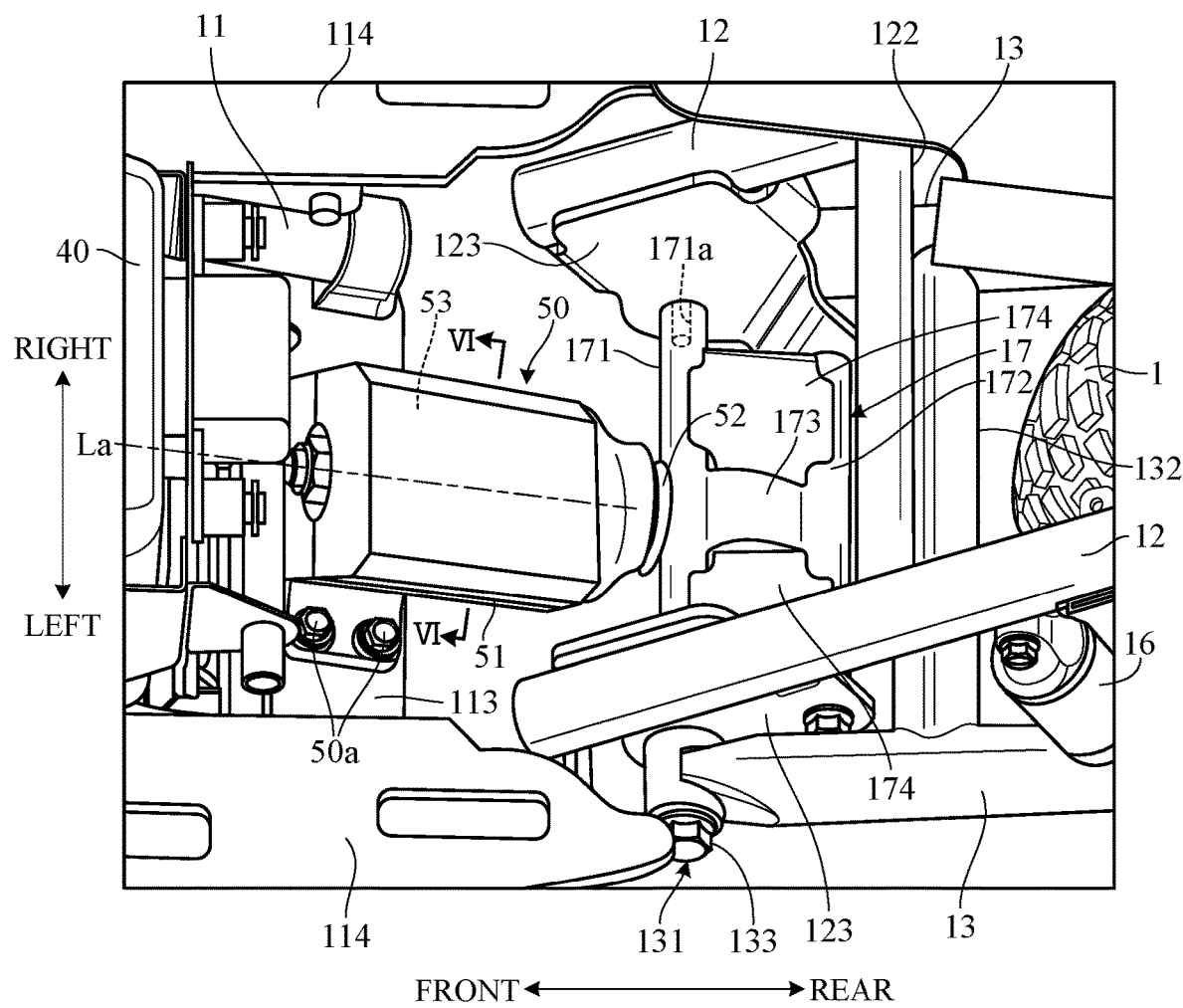
FIG. 5 is an enlarged perspective view illustrating a main configuration of the vehicle according to the embodiment of the present invention.

FIG. 5 is a perspective view of a substantial part of the vehicle 100 (when viewed obliquely from above) illustrating a configuration of component parts around the swing joint 50. In FIG. 5, illustration of the cover 20 is omitted for the sake of convenience. As illustrated in FIG. 5, the coupling plate 17 includes a pair of a front pipe portion 171 and a rear pipe portion 172 each having a substantially cylindrical shape and extending on an inner side in the left-right direction of the left and right brackets 123, a connection portion 173, which connects intermediate portions in the left-right direction of the front pipe portion 171 and the rear pipe portion 172, and a pair of left and right plate portions 174, which are bridged between the pipe portions 171 and 172 on both the left and right sides of the connection portion 173. The swing joint 50, the coupling plate 17, and the like constitute a coupling portion that swingably supports the rear vehicle body with respect to the front vehicle body.

Screw portions 171*a* are respectively provided at both left and right end portions of the front pipe portion 171, and bolts 133 penetrating through the swing arm 13 and the bracket 123 are screwed into the screw portion 171*a*. The front pipe portion 171 and the bolts 133 constitute the pivot shaft 131, which serves as a pivot fulcrum of the swing arm 13. An upper end portion of the bracket 123 is fixed to the seat frame 12 by welding, for example.

The rear end portions of the left and right side frames 11 are fixed to the coupling portion 113 in a substantially plate shape that extends in the left-right direction on a rear side with respect to the battery 40, and the left and right side frames 11 are coupled integrally through the coupling portion 113. Floor frames 114 are respectively fixed to the left and right side frames 11. The floor frame 114 extends in the front-rear direction to protrude outward in the left-right direction from the side frame 11, and the step 224 (FIG. 1A) is supported by the floor frame 114.

Figure 6:
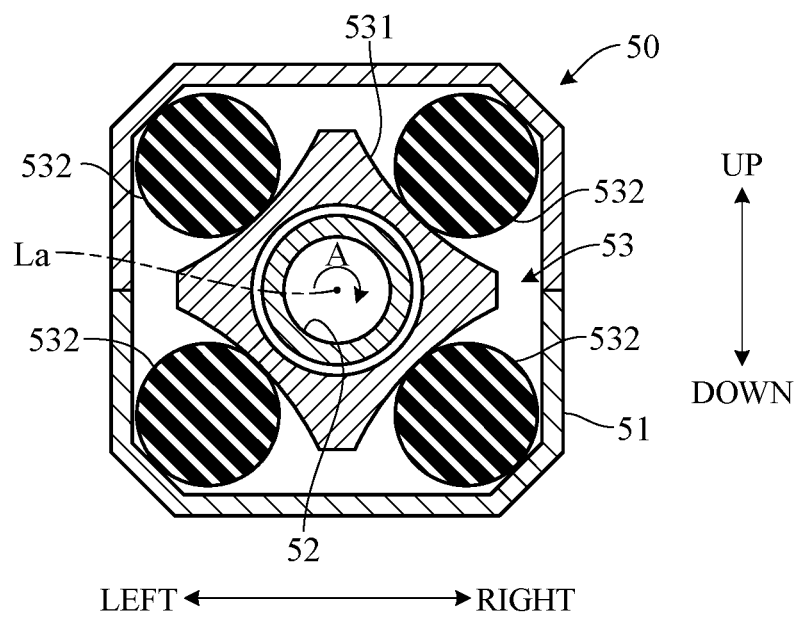
FIG. 6 is a cross-sectional view along line VI-VI in FIG. 5.

The swing joint 50 includes a joint case 51 formed in a substantially box shape, and a shaft portion 52 extending along the axial line La in the joint case 51 and protruding from a rear end surface of the joint case 51. FIG. 6 is a cross-sectional view (cross-sectional view taken along line VI-VI in FIG. 5) schematically illustrating an internal configuration of the swing joint 50. As illustrated in FIG. 6, the swing joint 50 includes a Neidhart damper 53 in its inside. The Neidhart damper 53 includes a cam block 531 in a substantially rhombic shape that is spline-coupled with the shaft portion 52, and rubber rollers 532 disposed to respectively oppose surfaces each formed in a concave shape of the cam block 531.

FIG. 6 illustrates an initial position before torque works on the shaft portion 52.

When the torque works on the shaft portion 52 from this state and the shaft portion 52 rotates about the axial line La (swing axis) in an arrow A direction in FIG. 6, the cam block 531 also rotates integrally with the shaft portion 52. In this situation, the cam block 531 elastically deforms the rubber rollers 532, and the rubber rollers 532 become elliptical. The rotational resistance to the shaft portion 52 increases, as the rotation angle increases. When the torque working on the shaft portion 52 becomes zero, the rubber rollers 532 return to the original shapes by the elastic force, and the shaft portion 52 returns to the initial position. Specifically, the rubber rollers 532 each function as a repulsive member capable of accumulating repulsive force when the shaft portion 52 rotates (swings) and urging the shaft portion 52 in a direction of returning the rotation.

As illustrated in FIG. 5, a front end portion of the swing joint 50, that is, a front end portion of the joint case 51 is fixed to an upper surface of the coupling portion 113 with bolts 50*a*. The rear end portion of the swing joint 50, that is, a rear end portion of the shaft portion 52 is fixed to a front end portion of the coupling plate 17. With such a configuration of the swing joint 50, the rear vehicle body (the seat frames 12 and the swing arms 13) is capable of swinging with respect to the front vehicle body (the side frames 11). As illustrated in FIG. 2, rear end portions of steps 224 are located on a rear side with respect to a front end portion of the rear cover 230, and gaps are respectively provided in the left-right direction between the rear cover 230, which is a part of the rear vehicle body, and the left and right steps 224. The gaps are provided so that the steps 224 do not come into contact with the rear cover 230, even when the rear vehicle body swings to the maximum with respect to the front vehicle body. Therefore, swinging is enabled without interference between the rear cover 230 and the steps 224.

Figure 7:
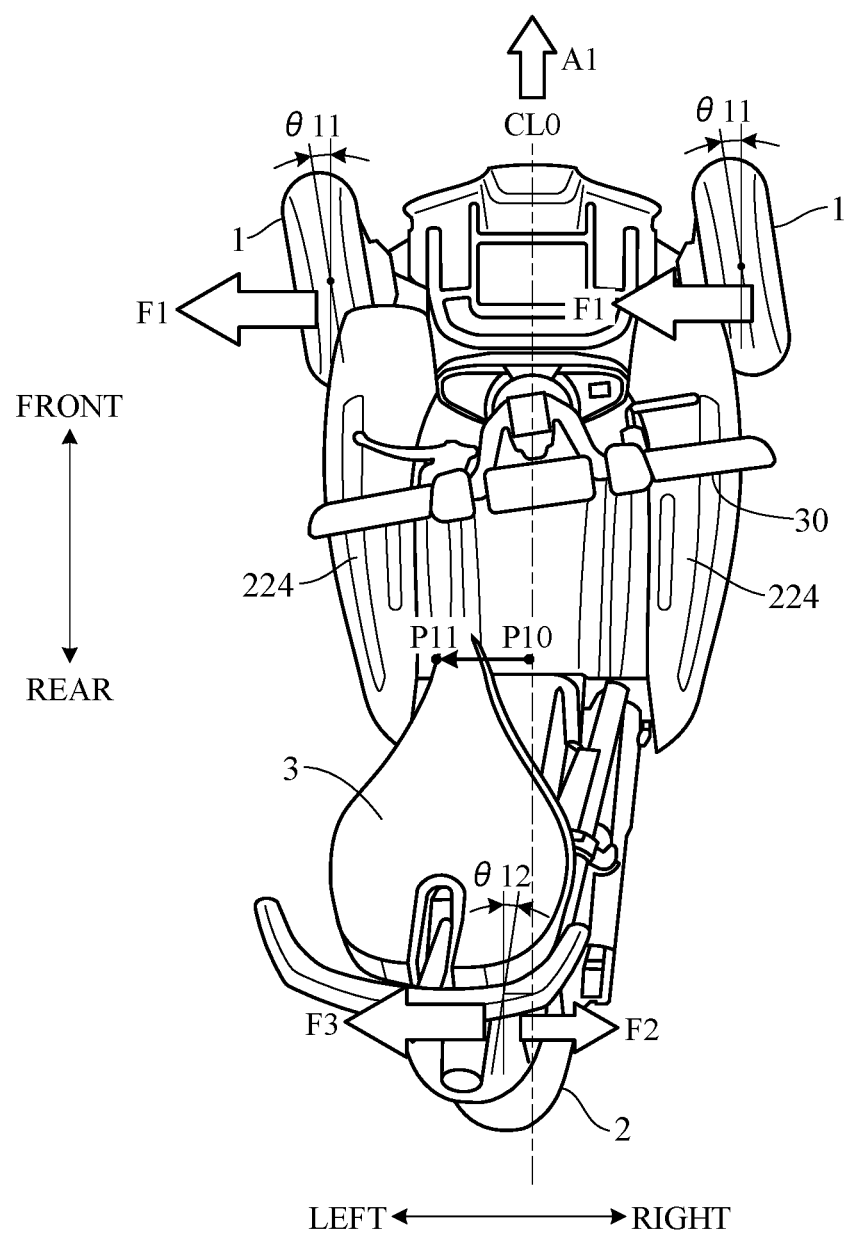
FIG. 7 is a plan view illustrating an example of an operation of the vehicle according to the embodiment of the present invention.

FIG. 7 is a plan view illustrating an operation when the vehicle 100 makes a turn (for example, turns to the left). At the time of turning to the left, the driver inclines his/her own body to the left while holding the non-swingable handlebar 30 on the front side of the vehicle and placing his/her own feet on the non-swingable steps 224 to support his/her own body (holding firmly). Furthermore, the driver steers the handlebar 30 to finely adjust the turning direction. In this situation, as illustrated in FIG. 7, the rear vehicle body swings, the rear wheel 2 is inclined to the left, and the gravity center position of the vehicle 100 changes to P11 on the left side from P10 on a vehicle center line CL0. In this manner, the rear vehicle body on which the user is seated swings, and the gravity center position of the vehicle 100 during traveling changes to be closer to the center of the turn. Thus, the turning performance can be improved.

The front wheels 1 face the left direction. Therefore, a leftward slip angle θ11 with respect to an advancing direction A1, that is, the slip angle θ11 in an identical direction to the turning direction is generated in the front wheels 1, and leftward cornering force as indicated by an arrow F1 works on the front wheels 1. On the other hand, the rear wheel 2 faces the right direction. Therefore, a rightward slip angle θ12, that is, the slip angle θ12 in an opposite direction to the turning direction is generated in the rear wheel 2, and rightward cornering force as indicated by an arrow F2 works on the rear wheel 2. That is, a toe angle opposite to the swing direction is generated in the rear wheel 2. Furthermore, a leftward camber thrust caused by the swing, as indicated by an arrow F3, works on the rear wheel 2.

Figure 8A:
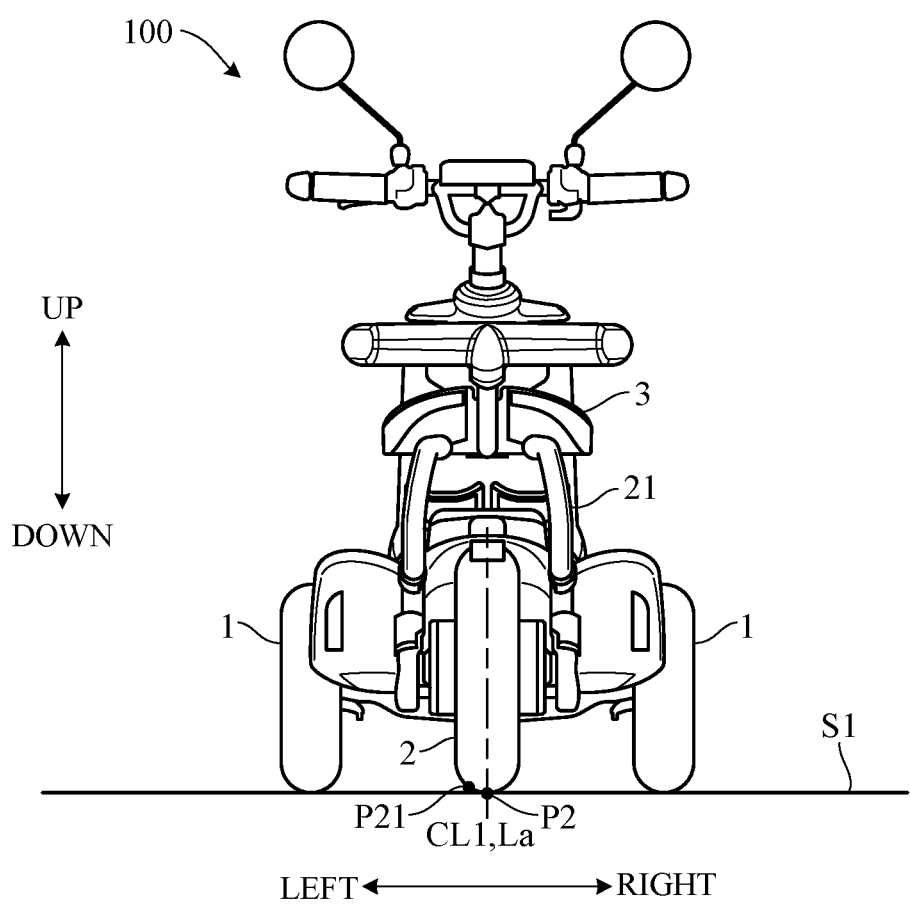
FIG. 8A is a rear view illustrating a state before swinging of the vehicle according to the embodiment of the present invention.
Figure 8B:
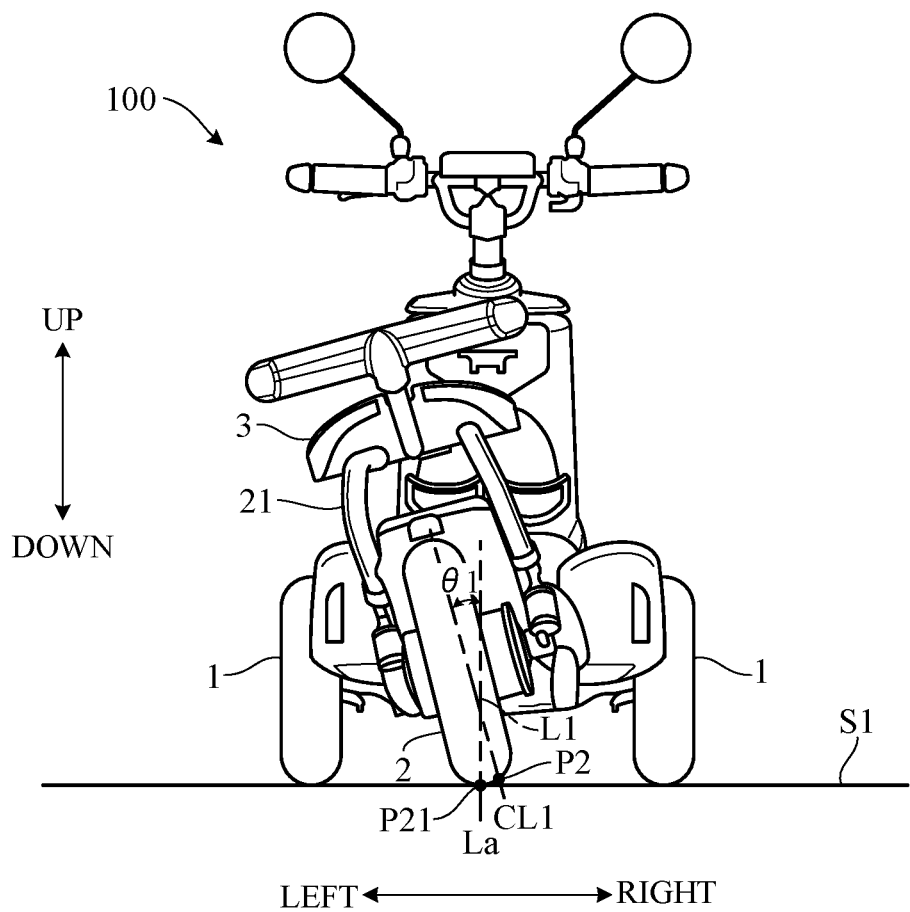
FIG. 8B is a rear view illustrating a state after swinging of the vehicle according to the embodiment of the present invention.

FIGS. 8A and 8B are rear views of the vehicle 100 respectively illustrating a state before swinging and a state after swinging of the rear vehicle body (a state before making a turn and a state after making a turn to the left). The position of the axial line La (swing axis) of the swing joint 50 is unchanged before and after swinging, and passes through the center in the left-right direction (on the vehicle center line CL0) of the vehicle 100. Therefore, as illustrated in FIG. 8A, a center line CL1 passing through the center in the width direction of the rear wheel 2 before swinging coincides with the axial line La. In FIG. 8B, an angle formed by the perpendicular line L0 (FIG. 3) perpendicular to the road surface S1 and the center line CL1, that is, a swing angle θ1 is, for example, 15 degrees.

The rear wheel 2 includes a tire having an arc-shaped cross-section in which a ground contact area hardly changes before and after swinging. Therefore, in the following description, it is assumed that the rear wheel 2 comes into contact with the road surface Si at a point (ground contact point) instead of a plane. Strictly, the tire elastically deforms and comes into contact with the road surface S1 on a plane. However, the ground contact area is narrow in a case where a tire having an arc-shaped cross-section is used. Hence, in the present embodiment, the center of the ground contact area is defined as the ground contact point for the sake of convenience. The ground contact point (pre-swing ground contact point) P2 in FIG. 8A is identical to the ground contact point P2 in FIG. 3.

As illustrated in FIG. 8B, when the rear wheel 2 swings leftward, a point P21 on the tire surface on a left side with respect to the pre-swing ground contact point P2 becomes a new ground contact point (post-swing ground contact point). On the other hand, the pre-swing ground contact point P2 is shifted to a right side with respect to the axial line La, and moves upward from the road surface S1. Note that although the movement of the ground contact point is small, the position of the ground contact point is illustrated in an exaggerated manner in FIGS. 8A and 8B. As illustrated in FIG. 8A, the post-swing ground contact point P21 is located above the road surface S1 before swinging, and is not in contact with the ground. In other words, at the time of swinging, the post-swing ground contact point P21 moves to under the axial line La, as illustrated in FIG. 8B. Accordingly, the post-swing ground contact point P21 coincides with the position in the left-right direction of the axial line La, when the vehicle 100 makes a turn, and the turning performance of the vehicle 100 is improved. In the present embodiment, attention is given to a position change of the post-swing ground contact point P21, which is not in contact with the ground before swinging, but which is in contact with the ground after swinging. Therefore, the post-swing ground contact point P21 may be referred to as an attention point. The post-swing ground contact point P21 is preferably provided so as to coincide with the axial line La all the time from a swing start to a maximum swing state.

Figure 9:
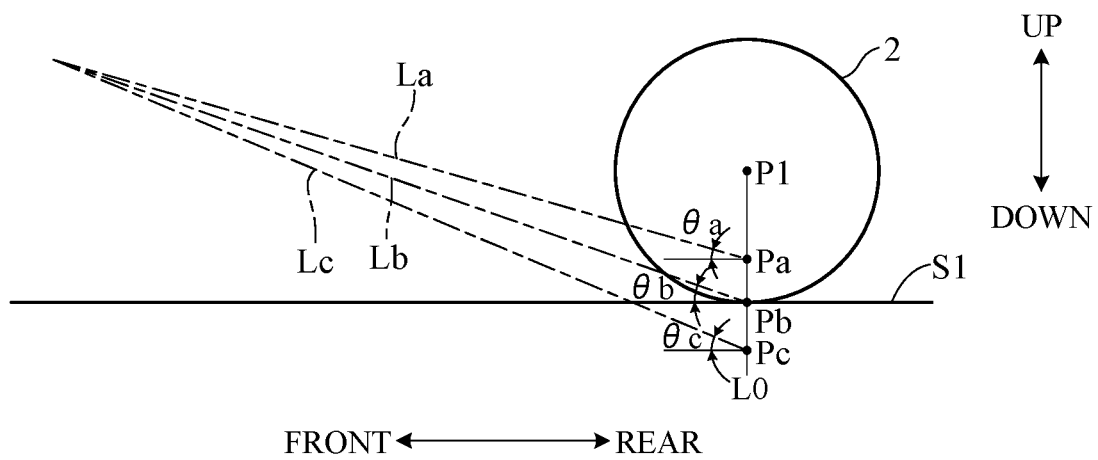
FIG. 9 is a view for describing setting of an axial line of a swing joint provided at the vehicle according to the embodiment of the present invention.

FIG. 9 is a view for describing settings of the axial line La of the swing joint 50, and schematically illustrates the position of the axial line La before swinging. The axial line La in the drawing is identical to that in FIG. 3, and axial lines Lb and Lc are comparative examples in the present embodiment. Angles θa, θb, and θc respectively formed by the axial lines La, Lb, and Lc and the horizontal line, that is, the inclination angle increases in the order of the axial lines La, Lb, and Lc (θa<θb<θc). Therefore, respective intersections Pa, Pb, and Pc of the perpendicular line L0 drawn from the rotation center P1 of the rear wheel 2 to the road surface S1 and the axial lines La, Lb, and Lc are located to be higher in the order of Pc, Pb, and Pa. In particular, the intersection Pa is located to be higher than the ground contact point P2 (FIG. 8A), the intersection Pb is located at an identical position to the ground contact point P2, and the intersection Pc is located to be lower than the ground contact point P2.

Figure 10A:
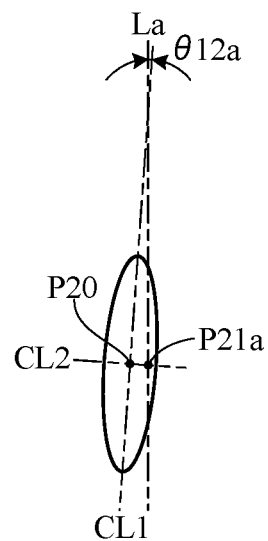
FIG. 10A is a plan view illustrating a position change of the rear wheel when the vehicle according to the embodiment of the present invention swings.
Figure 10B:
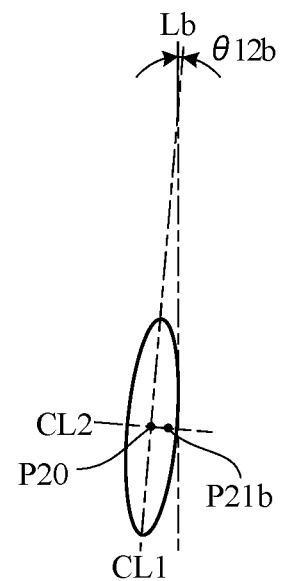
FIG. 10B is a view illustrating a first comparative example of FIG. 10A.
Figure 10C:
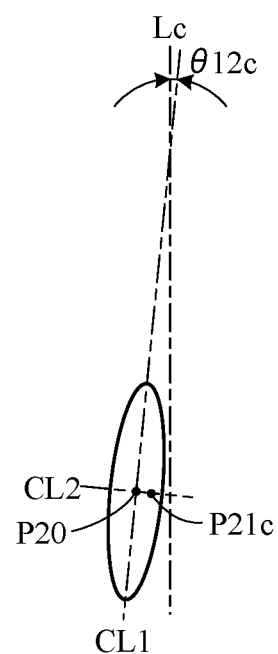
FIG. 10C is a view illustrating a second comparative example of FIG. 10A.

FIGS. 10A to 10C are plan views each illustrating a position change of the rear wheel 2 with respect to the axial lines La, Lb, and Lc, in a case where the rear vehicle body is made to swing to the left side when the vehicle 100 turns to the left, in a similar manner to FIG. 8B. P21a, P21b, and P21c in the drawing respectively correspond to the post-swing ground contact point P21 in FIG. 8B. An intersection P20 of the center line CL1 in the width direction of the rear wheel 2 and a center line CL2 along the rotation center of the rear wheel 2 corresponds to a center point indicating the center position of the rear wheel 2.

As illustrated in FIG. 10A, in the present embodiment, the post-swing ground contact point P21a is located on the axial line La (an identical position to the position in the left-right direction of the axial line La). Therefore, the positions of the ground contact points are identical to each other before and after swinging (both on the axial line La), and the vehicle 100 is capable of making a turn smoothly in accordance with swinging of the rear vehicle body. On the other hand, as illustrated in FIGS. 10B and 10C, in the comparative examples of the present embodiment, the post-swing ground contact points P21b and P21c are respectively shifted to the left side with respect to the axial lines Lb and Lc. In this case, the shift amount is larger in the example of FIG. 10C than that in the example of FIG. 10B. When the post-swing ground contact points P21b and P21c are respectively shifted in the left-right direction with respect to the axial lines Lb and Lc in this manner, the position of the ground contact point is shifted from the swing axis (axial lines Lb and Lc) whenever the vehicle 100 makes a turn. Accordingly, it is difficult to make a turn smoothly.

In addition, as illustrated in FIG. 10A, in the present embodiment, a slip angle θ12a of the rear wheel 2 when the vehicle 100 makes a turn faces an opposite direction to the turning direction. Therefore, a turning radius of the vehicle 100 can be made small, and a small-turning performance is improved. As illustrated in FIGS. 10A to 10C, the slip angles θ12a, θ12b, and θ12c of the rear wheel 2 when the vehicle 100 makes a turn are larger, as the inclination angles of the axial lines La, Lb, and Lc (FIG. 9) become larger (θ12a<θ12b<θ12c). Therefore, the small-turning performance of the vehicle 100 is adjustable by appropriately setting the inclination angle.

According to the present embodiment, the following operations and effects are achievable.

(1) The vehicle 100 includes the front wheels 1 and the rear wheel 2, the rear vehicle body (the seat frames 12 and the swing arms 13) that supports the rear wheel 2 to be rotatable, the front vehicle body (the side frames 11) disposed on a front side of the rear vehicle body, and the swing joint 50 that is disposed between the rear vehicle body and the front vehicle body, that is fixed to each the rear vehicle body and the front vehicle body, and that supports the rear vehicle body to be swingable in the left-right direction with respect to the front vehicle body about the axial line La extending in the front-rear direction (FIGS. 1A, 1B, and 3).

The swing joint 50 is provided so that the position in the left-right direction of an attention point (the post-swing ground contact point P21), on the surface of the rear wheel 2, that constitutes the center of the ground contact area between the rear wheel 2 and the road surface S1, when the rear vehicle body swings about the axial line La, is closer to the axial line La than the position before the rear vehicle body swings. More specifically, the swing joint 50 is provided so that the position in left-right direction of the attention point after swinging substantially coincides with the position in left-right direction of the axial line La (FIGS. 8A, 8B, and 10A). In other words, the swing joint 50 is provided so that in a case where the ground contact point is set to the center of the area on the surface of the rear wheel 2 in contact with the road surface S1 (ground surface), the position in the left-right direction of the post-swing ground contact point P21 (FIG. 8B), which is a ground contact point when the rear vehicle body swings about the axial line La, is closer to the axial line La than the position in the left-right direction of the post-swing ground contact point P21 (FIG. 8A) before the rear vehicle body swings.

With this configuration, the ground contact points (the pre-swing ground contact point P2 and the post-swing ground contact point P21) are both located below the axial line La, before and after the rear vehicle body swings. Therefore, the ground contact point can be prevented from being shifted in the left-right direction from the axial line La at the time of swinging, and the vehicle 100 is capable of making a turn smoothly.

(2) The swing joint 50 is provided such that the intersection Pa of the axial line La and the perpendicular line L0 to the road surface S1 passing through the rotation center P1 of the rear wheel 2 before the rear vehicle body swings is located to be higher than the road surface S1 (FIGS. 3 and 9). Accordingly, the position in the left-right direction of the attention point after swinging (the post-swing ground contact point P21) can be made to coincide with the axial line La.

(3) The axial line La of the swing joint 50 is provided to be inclined with a downward gradient toward the rear side (FIGS. 3 and 9). Accordingly, the slip angle θ12a of the rear wheel 2 can be generated in an opposite direction to the turning direction (FIG. 10A), and the turning performance of the vehicle 100 can be improved.

(4) The swing joint 50 and the rear vehicle body are provided such that when the rear vehicle body swings about the axial line La, the direction of the rear wheel 2 (direction orthogonal to the rotation shaft of the rear wheel 2) is shifted with respect to the front-rear direction (axial line La) that is the advancing direction of the vehicle 100 (FIG. 10A). Accordingly, the small-turning performance of the vehicle 100 can be easily improved.

(5) The vehicle 100 further includes the seat 3 and the guide 126, which are coupled with the rear vehicle body to swing integrally with the rear vehicle body, and which supports the user's buttocks or back (FIGS. 1A and 1B). Accordingly, the rear vehicle body can be easily swung by the weight shift of the user.

(6) The vehicle 100 further includes the step 224 provided integrally with the front vehicle body to enable the user's foot to be placed on (FIGS. 1A and 1B). Accordingly, the user is able to easily swing the rear vehicle body with respect to the front vehicle body while holding his/her own feet firmly.

(7) The axial line La extends in the front-rear direction along the vehicle center line CL0 at the center in the left-right direction of the vehicle 100 (FIGS. 3 and 7). The front wheel 1 includes two wheels arranged on both sides in the left-right direction of an extension line of the axial line La, and the rear wheel 2 includes a single wheel arranged at the center in the left-right direction of the vehicle 100 (FIGS. 1A, 1B, and 7). In such a three-wheeled vehicle including two front wheels and one rear wheel, the rear wheel 2 side is configured to swing as in the present embodiment, so that the vehicle 100 is capable of standing by itself when stopped, and it is possible to improve the turning performance, while ensuring the stability of the vehicle 100.

Figure 11A:
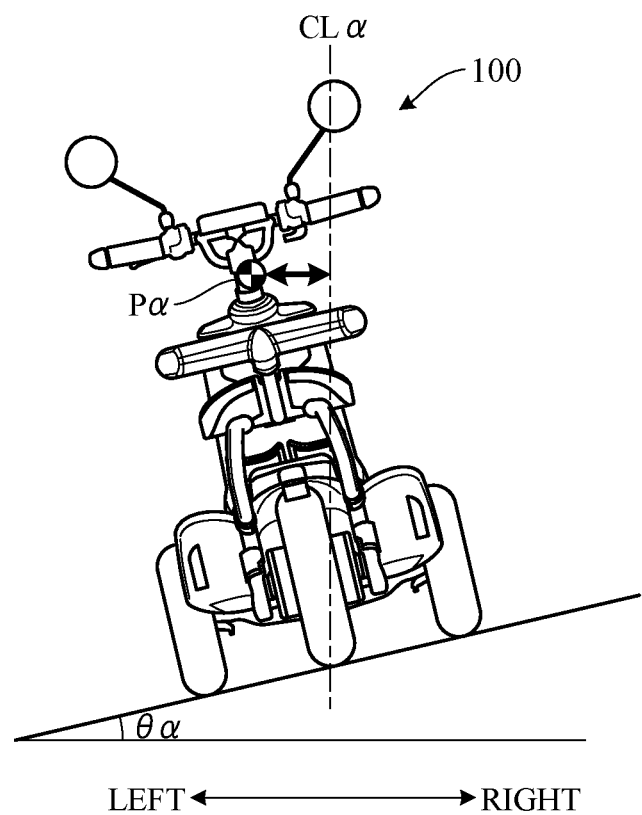
FIG. 11A a rear view of the vehicle traveling on a lateral-side inclined surface.

The vehicle 100 in the present embodiment, by the way, is configured to be swingable. Hence, the following drawback may occur, when the vehicle travels on the ground inclined in the vehicle width direction (on a lateral-side inclined surface). FIG. 11A is a rear view of the vehicle 100 traveling on a lateral-side inclined surface that is inclined at a predetermined angle θa with respect to the horizontal plane. As illustrated in FIG. 11A, while the vehicle is traveling on the lateral-side inclined surface, a gravity center position Pα of the vehicle 100 is shifted in the left-right direction (to a valley side) from a reference line CLα extending in the vertical direction passing through the ground contact point of the rear wheel 2. For this reason, a moment due to gravity at the gravity center position Pα works on the rear vehicle body with the ground contact point of the rear wheel 2 as a fulcrum.

Figure 11B:
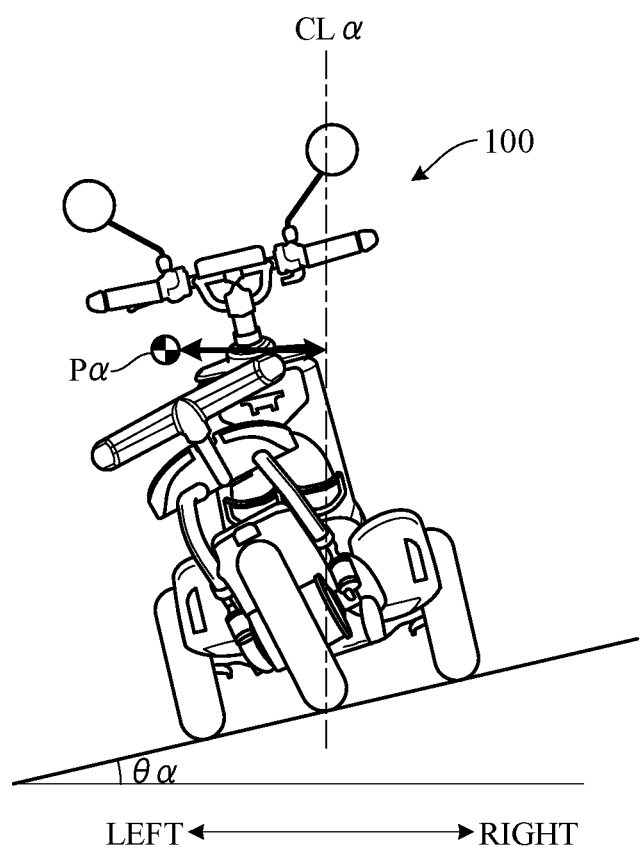
FIG. 11B is a rear view illustrating a state in which the vehicle swings with respect to FIG. 11A.
Figure 11C:
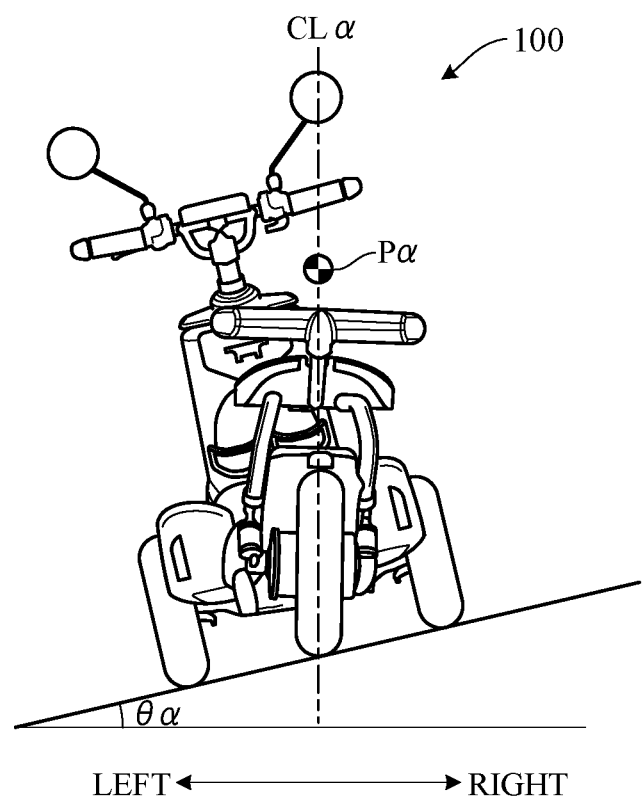
FIG. 11C is a rear view illustrating a state in which the swinging of the rear wheel of the vehicle in FIG. 11B is returned.

As a result, as illustrated in FIG. 11B, the inclination amount of the rear vehicle body increases, and the gravity center position Pα is further shifted in the left-right direction (to the valley side) from the reference line CLα. From this state, in order to make the gravity center position Pα coincide with the reference line CLα as illustrated in FIG. 11C, the user has to shift his/her own weight and change the posture. However, the weight shift amount of the user is large in recovering the posture to the state of FIG. 11C from the state of FIG. 11B. Hence, this is a large burden for the user. Such a drawback similarly occurs not only in a case where the vehicle 100 travels on the lateral-side inclined surface but also in a case where the rear vehicle body is inclined outward in the turning radius direction due to the centrifugal force working on the vehicle 100, when the vehicle 100 makes a turn.

Therefore, in order to restrict swinging of the rear vehicle body during traveling on the lateral-side inclined surface or during traveling while making a turn, in the present embodiment, as will be described in the following, a restricting portion is provided in the coupling portion (swing joint 50) that supports the front vehicle body and the rear vehicle body so as to be relatively swingable in the left-right direction.

Figure 12:
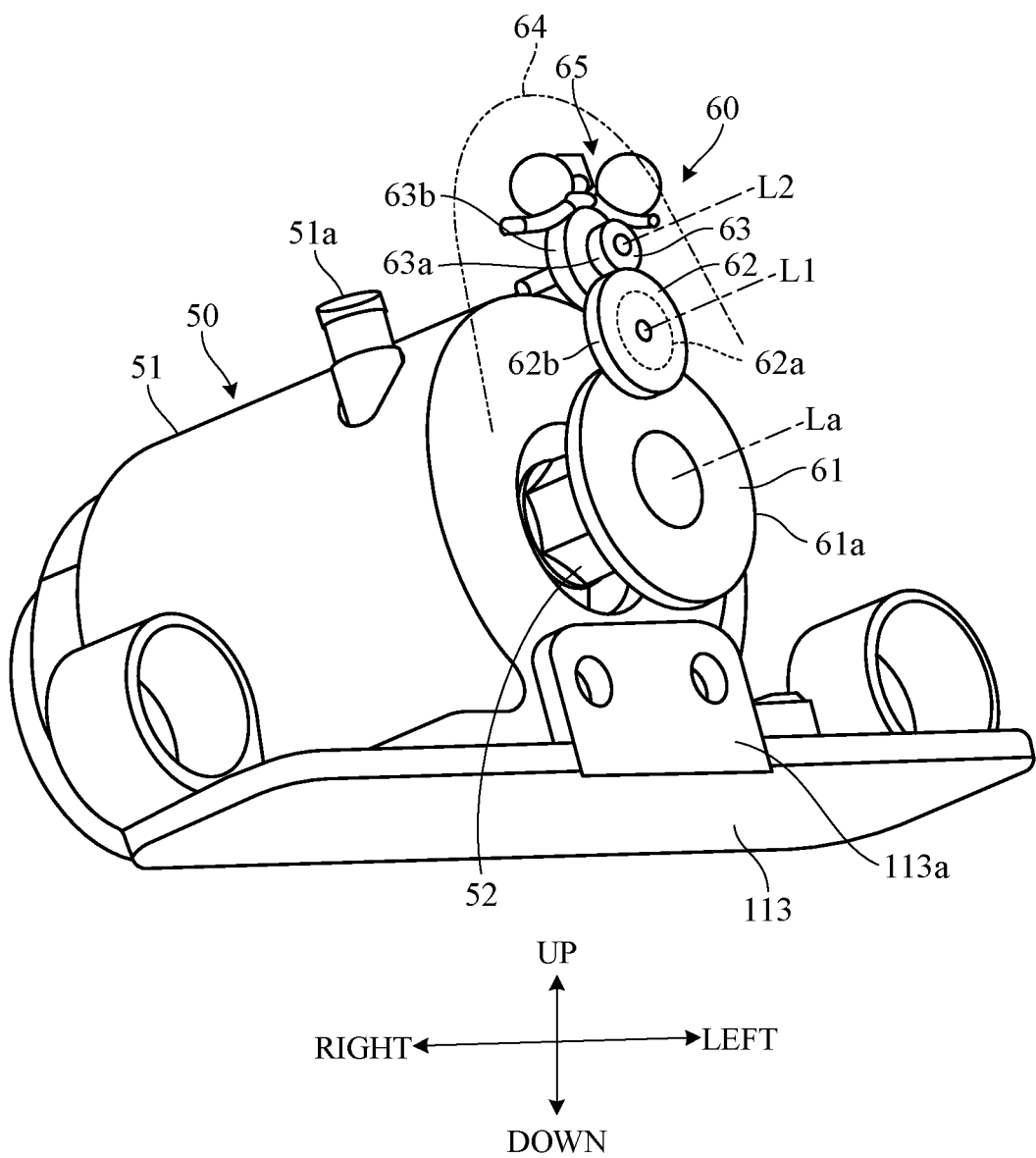
FIG. 12 is a perspective view illustrating a configuration of a restricting portion provided at the vehicle according to the embodiment of the present invention.

FIG. 12 is a perspective view of the swing joint 50, when viewed from an obliquely front side. As illustrated in FIG. 12, the swing joint 50 is fixed to the coupling portion 113, with which rear end portions (not illustrated) of the left and right side frames 11 are fit. A restricting portion 60 is disposed to be adjacent to a front end surface of the swing joint 50. More specifically, a circular plate 61 is fixed to the front end portion of the shaft portion 52 of the swing joint 50, and the circular plate 61 rotates integrally with the shaft portion 52 about the axial line La. A gear 61a having a predetermined number of teeth Z1 (for example, Z1=100) is formed on an outer circumferential surface of the circular plate 61. A rotating body 62, which is rotatable about an axial line L1 parallel to the axial line La, is disposed above the circular plate 61.

The rotating body 62 includes a small-diameter circular plate and a large-diameter circular plate respectively on a front side and a rear side to rotate integrally with each other about the axial line L1. A gear 62a having a predetermined number of teeth Z2 (for example, Z2=20) to mesh with the gear 61a is formed on an outer circumferential surface of the small-diameter circular plate. A gear 62b having a predetermined number of teeth Z3 (for example, Z3=50) is formed on an outer circumferential surface of the large-diameter circular plate. A rotating body 63, which is rotatable about an axial line L2 parallel to the axial line La, is disposed above the rotating body 62. The rotating body 63 includes a small-diameter circular plate 631 and a large-diameter circular plate 632 respectively on a front side and a rear side to rotate integrally with each other about the axial line L2 (see FIG. 13A). A gear 63a having a predetermined number of teeth Z4 (for example, Z4=20) to mesh with the gear 62b is formed on an outer circumferential surface of the small-diameter circular plate 631. An engaging portion 65, which is engageable with an outer circumferential surface 63b of the circular plate, is disposed above the large-diameter circular plate 632.

Although not illustrated in detail, the rotating bodies 62 and 63 and the engaging portion 65 are supported via a bracket 64. The bracket 64 is fixed to a bracket 113a at a front end portion of the coupling portion 113 and the joint case 51 of the swing joint 50 (for example, an upper end portion of a bolt 51a, which protrudes from the joint case 51).

Figure 13A:
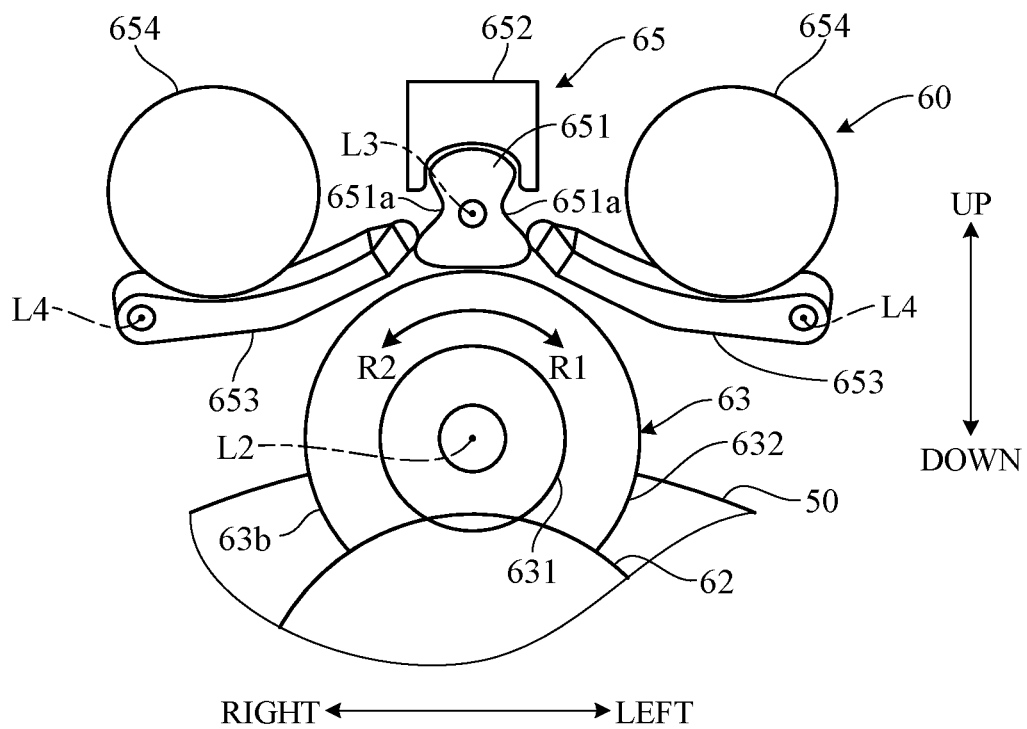
FIG. 13A is a front view illustrating a main configuration of the restricting portion in FIG. 12.

FIG. 13A is a front view (a view when viewed from the front side) illustrating a configuration of a substantial part of the restricting portion 60, and is a view illustrating an initial state in a case where the vehicle 100 travels straight on a horizontal road surface. As illustrated in FIG. 13A, the engaging portion 65 includes a sprag 651, which is disposed above the rotating body 63 so as to face an outer circumferential surface 63b of the large-diameter circular plate 632. A case 652 is disposed above the sprag 651 so as to surround an upper portion of the sprag 651. In the initial state of FIG. 13A, a gap is provided between the sprag 651 and the case 652, and the sprag 651 is swingable in the left-right direction about an axial line L3 in the front-rear direction. A bottom surface of the sprag 651 is formed in a gently curved surface shape. Recesses 651a are respectively provided on the left and right side surfaces of the sprag 651.

Levers 653 are respectively provided on both left and right sides of the sprag 651 so as to be pivotable in the up-down direction about an axial line L4 parallel to the axial line La. The lever 653 is formed to be curved upward toward an inner side in the left-right direction. In the initial state, the lever 653 is located at an initial position that is pivoted upward. In this situation, tip end portions of the levers 653 are respectively disposed to face the recesses 651a, while being spaced apart from the left and right side surfaces of the sprag 651. Balls 654 are respectively mounted on the upper surfaces of the left and right levers 653 so as to be movable in the left-right direction along upper surfaces of the levers 653.

In the initial state, the ball 654 is located on a base end portion side (outer side in the left-right direction) of the lever 653. In this situation, a bottom surface of the sprag 651 is spaced apart from the outer circumferential surface 63b of the large-diameter circular plate 632 of the rotating body 63. Therefore, the rotating body 63 is rotatable in any of an R1 direction and an R2 direction in FIG. 13A. In the state of FIG. 13A, when the vehicle 100 travels on, for example, the lateral-side slope as illustrated in FIG. 11A, the shaft portion 52 rotates due to swinging of the rear vehicle body. The rotation of the shaft portion 52 is transmitted to the rotating body 63 through the gear 61a of the circular plate 61, the gears 62a and 62b of the rotating body 62, and the gear 63a of the rotating body 63.

Figure 13B:
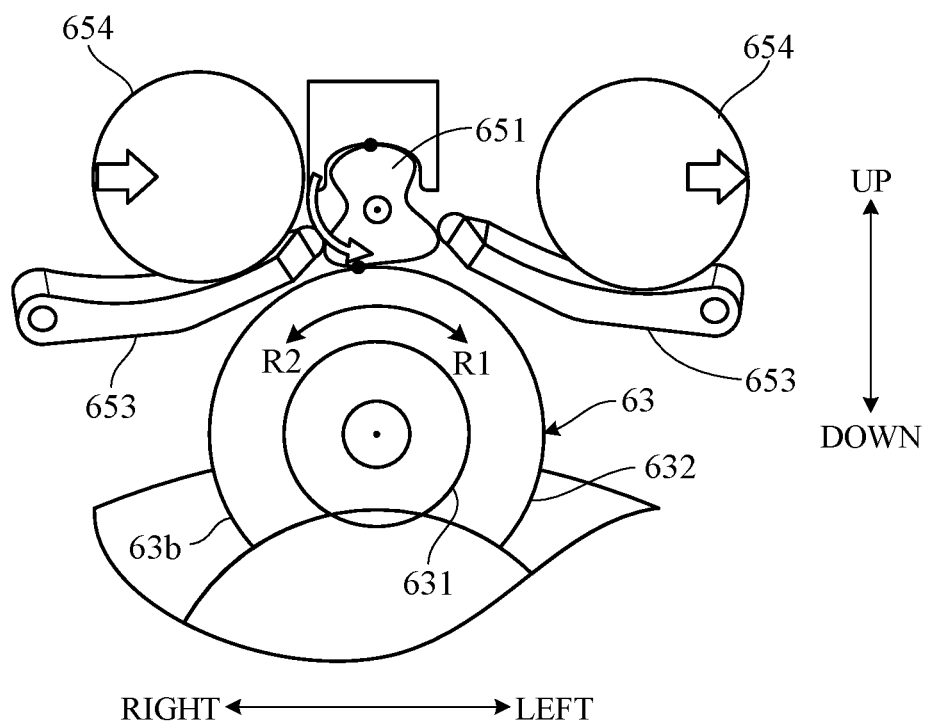
FIG. 13B is a front view illustrating an operation of the restricting portion following FIG. 13A.

While traveling on the lateral-side slope, the balls 654 move leftward by gravity as illustrated in FIG. 13B. Therefore, the lever 653 on the right side pivots downward, the tip end portion of the lever 653 abuts a right end surface of the sprag 651, and pushes downward a right end portion on a lower side of the sprag 651. Accordingly, the sprag 651 swings leftward, and the bottom surface of the sprag 651 abuts the outer circumferential surface 63b of the circular plate 632 of the rotating body 63. As a result, the rotation of the rotating body 63 in the R1 direction is inhibited, and a leftward swing of the rear vehicle body is inhibited.

While traveling on the lateral-side slope, the rotation of the shaft portion 52 is accelerated at a predetermined speed increase ratio (for example, 12.5) from the ratio of the numbers of teeth of the gears 61a, 62a, 62b, and 63a, and is transmitted to the rotating body 63. Therefore, the rotation amount of the rotating body 63 is increased more than the rotation amount of the shaft portion 52, and thus the rotation, that is, swinging of the shaft portion 52 can be suppressed with high sensitivity.

In this manner, while traveling on the lateral-side slope, the rear vehicle body is restricted from swinging leftward, so that the swing amount of the rear vehicle body is suppressed in the state of FIG. 11A. In this situation, the rotation of the rotating body 63 in the R2 direction in FIG. 13B is permitted, and the rear vehicle body is capable of swinging rightward. Accordingly, the user is easily able to recover his/her own posture to the state of FIG. 11C. In a case where the centrifugal force works while the vehicle is traveling and making a turn, the balls 654 move in the direction of the centrifugal force. Therefore, similarly to the case where the vehicle travels on the lateral-side slope, swinging of the rear vehicle body can be restricted.

Figure 14:
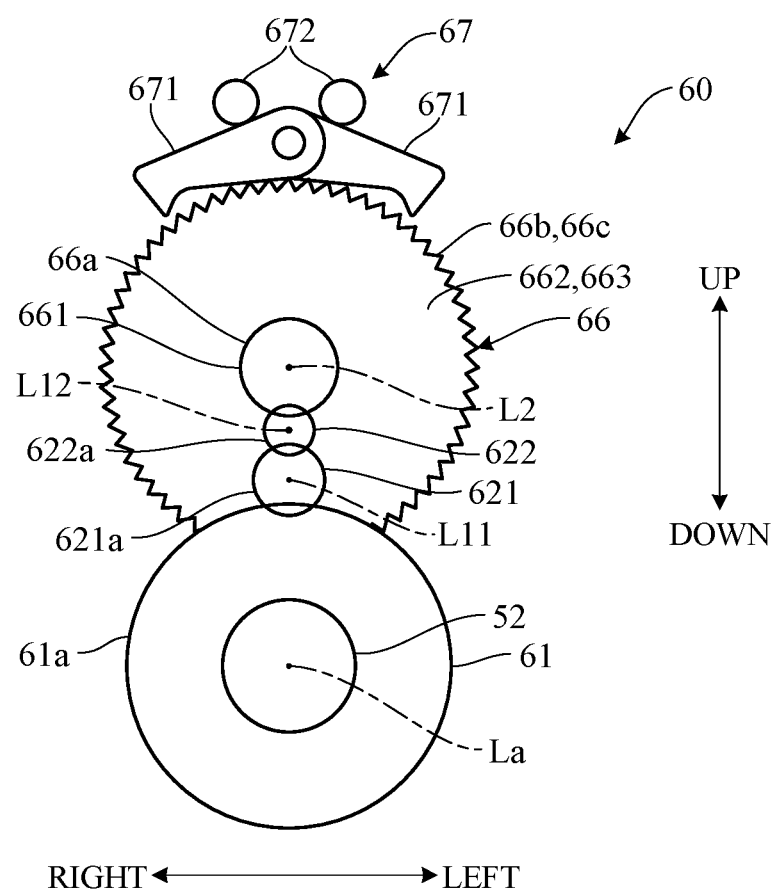
FIG. 14 is a front view illustrating a main configuration of another restricting portion provided at the vehicle according to the embodiment of the present invention.

FIG. 14 is a front view (a view when viewed from the front side) illustrating another configuration of the restricting portion. Note that the same parts as those in FIG. 12 are denoted by the same reference numerals. In the example of FIG. 14, the restricting portion 60 includes the circular plate 61 coupled with the front end portion of the shaft portion 52, a rotating body 621 disposed on an upper side of the circular plate 61, a rotating body 622 disposed on an upper side of the rotating body 621, and the rotating body 66 rotatable about the axial line L2. The rotating body 621 and the rotating body 622 are respectively rotatable about axial lines L11 and L12 parallel to the axial line L2. On outer circumferential surfaces of the rotating bodies 621 and 622, gears 621a and 622a each including a predetermined number of teeth that mesh with each other are formed. The gear 61a of the circular plate 61 meshes with the gear 621a.

Figure 15:
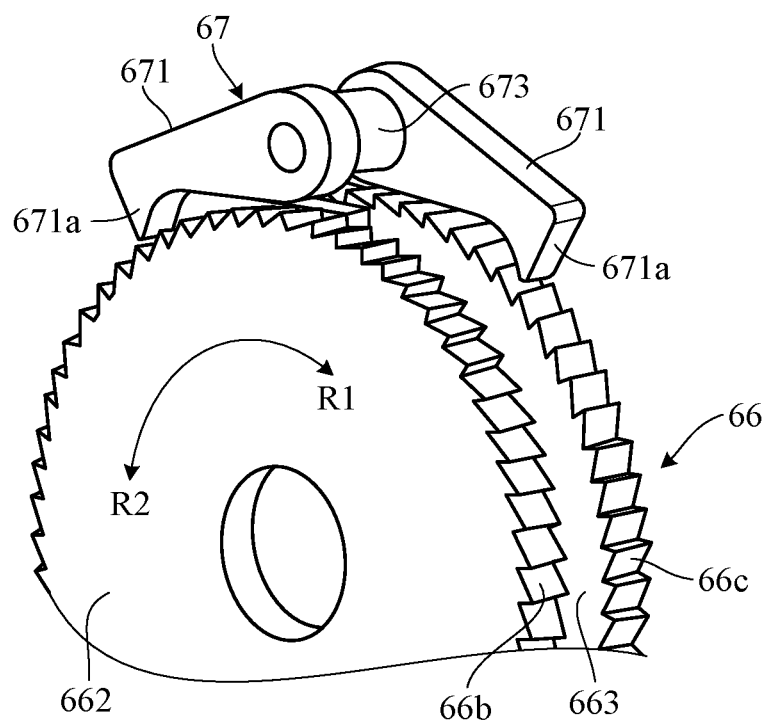
FIG. 15 is a perspective view illustrating a main configuration of the restricting portion in FIG. 14.

The rotating body 66 includes a small-diameter circular plate 661 and a pair of front and rear large-diameter circular plates 662 and 663, which rotate integrally with each other about the axial line L2. A gear 66a having a predetermined number of teeth so as to mesh with the gear 622a is formed on an outer circumferential surface of the circular plate 661. The circular plates 662 and 663 each have a larger diameter than that of the circular plate 632 in FIG. 12, and gears 66b and 66c are respectively formed on their outer circumferential surfaces, as illustrated in FIG. 15. Each tooth of the gear 66b is formed to be inclined in the R1 direction, and each tooth of the gear 66c is formed to be inclined in the R2 direction.

As illustrated in FIG. 14, a pair of left and right engaging portions 67 are respectively provided above the circular plates 662 and 663. The engaging portion 67 includes a pair of left and right levers 671 pivotable in the up-down direction, and a pair of left and right balls 672, which move in a direction onto which the gravity or centrifugal force works, and push the respective levers 671. In FIG. 14, the engaging portion 67 is illustrated in a simplified manner. Although not illustrated, the rotating bodies 621, 622, and 66 and the engaging portion 67 are supported by the coupling portion 113 and the joint case 51 via the bracket in a similar manner to FIG. 12.

FIG. 15 is a perspective view illustrating a configuration of a substantial part of the engaging portion 67. In FIG. 15, illustration of the balls 672 is omitted. As illustrated in FIG. 15, the pair of left and right levers 671 are pivotally supported via a single shaft portion 673 extending in the front-rear direction. FIG. 15 illustrates an initial state before the balls 672 move in the left-right direction. In this state, claws 671a at tip end portions of the left and right levers 671 are respectively spaced apart from the gears 66b and 66c, and the circular plates 662 and 663 are rotatable in the R1 direction and the R2 direction in FIG. 15. The rotating directions of the circular plates 662 and 663 are opposite to the rotating direction of the circular plate 61. The numbers of teeth of the gears 621a and 622a are appropriately set so that the torque is transmitted from the circular plate 61 to the circular plates 662 and 663 at a predetermined speed increase ratio.

From this state, for example, the vehicle 100 travels on a lateral-side slope, and when the balls 672 move leftward due to gravity, the claw 671a of the lever 671 on the left side is engaged with the gear 66b. Accordingly, the rotation of the rotating body 66 in the R2 direction is inhibited, and swinging of the rear vehicle body can be restricted. In this situation, the rotation of the rotating body 66 in the R1 direction is permitted, so that the user is easily able to recover his/her own posture.

The levers 671 may extend in a substantially arc shape along the outer circumferential surface of the circular plates 662 and 663 so that the tip end portions of the levers 671 are located to be slightly lower than the axial line L2, and weights may be provided at the tip end portions of the levers 671. In this case, the circular plates 662 and 663 are configured to rotate in an identical direction to the circular plate 61. For example, the rotating body 622 is omitted, and the gear 621a of the rotating body 621 is configured to mesh with the gear 61a and the gear 66a. According to this configuration, when the gravity or centrifugal force works on the weight, the lever 671 pivots, and the claw 671a at the tip end is engaged with the gear 66b or 66c. For example, when leftward gravity works on the weight, the claw 671a of the lever 671 on the right side is engaged with the gear 66b. Therefore, the ball 672 for pivoting the lever 671 is unnecessary.

Figure 16A:
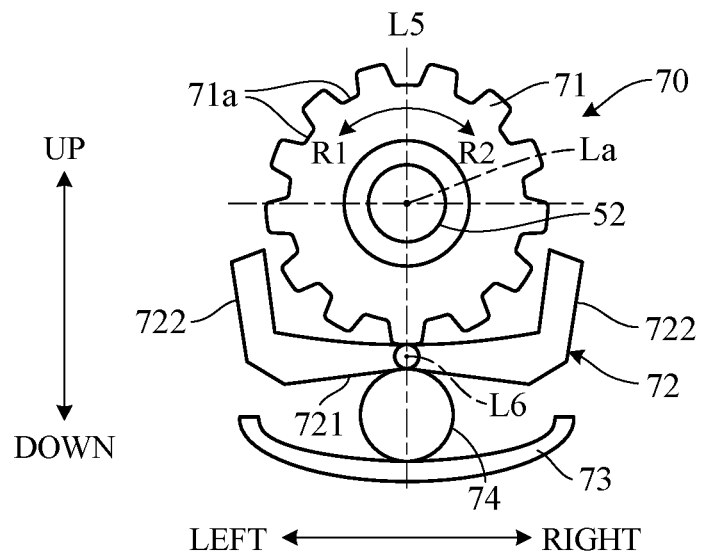
FIG. 16A is a front view illustrating further other restricting portion provided at the vehicle according to the embodiment of the present invention.

FIG. 16A is a view illustrating further another configuration of the restricting portion. Similarly to the other restricting portions 60, a restricting portion 70 illustrated in FIG. 16A is also disposed to be adjacent to the front end surface of the swing joint 50. As illustrated in FIG. 16A, the restricting portion 70 includes a rotating body 71, which is coupled with the front end portion of the shaft portion 52, and which rotates integrally with the shaft portion 52 about the axial line La. On an outer circumferential surface of the rotating body 71, a plurality of groove portions 71a are formed in an uneven shape over the entire circumference. A lock member 72 (engaging portion) is disposed below the rotating body 71 so as to be swingable about an axial line L6, which is located on a vertical line L5 passing through the axial line La, and which is parallel to the axial line La. The lock member 72 includes a horizontal portion 721 extending in the left-right direction, and vertical portions 722 respectively extending upward from both left and right end portions of the horizontal portion 721, and is configured to be left-right symmetric as a whole.

A case 73 including an upper surface in a substantially concave curved shape is disposed below the lock member 72. A ball 74 is disposed between the lock member 72 and the case 73 so as to be movable in the left-right direction. Although not illustrated, the lock member 72 is swingably supported by, for example, the joint case 51, and the case 73 is fixed to the joint case 51.

FIG. 16A corresponds to a state in which the vehicle 100 travels straight, and in this state, the ball 74 is located on the vertical line L5. For this reason, the lock member 72 does not swing, and upper end portions of the left and right vertical portions 722 are spaced apart from the outer circumferential surface of the rotating body 71. Therefore, the rotating body 71 is rotatable in any of the R1 direction and the R2 direction, and the rear vehicle body is swingable to the left and right.

Figure 16B:
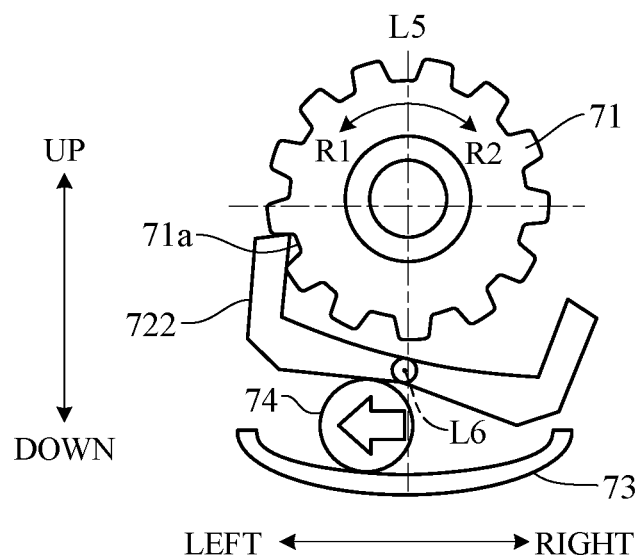
FIG. 16B is a front view illustrating an example of an operation of the restricting portion following FIG. 16A.

From this state, when the vehicle 100 travels on a lateral-side slope that is inclined upward to the right (FIG. 11A) or turns to the right, the ball 74 moves to the left side as illustrated in FIG. 16B. Accordingly, the lock member 72 swings rightward about the axial line L6 as a fulcrum, and the upper end portion of the vertical portion 722 on the left side of the lock member 72 is engaged with the groove portion 71a of the rotating body 71. As a result, the rotation of the rotating body 71 in the R1 direction is inhibited, and a leftward swing of the rear vehicle body is inhibited. In this situation, the rotation of the rotating body 71 in the R2 direction is enabled, and a rightward swing of the rear vehicle body is permitted.

Figure 16C:
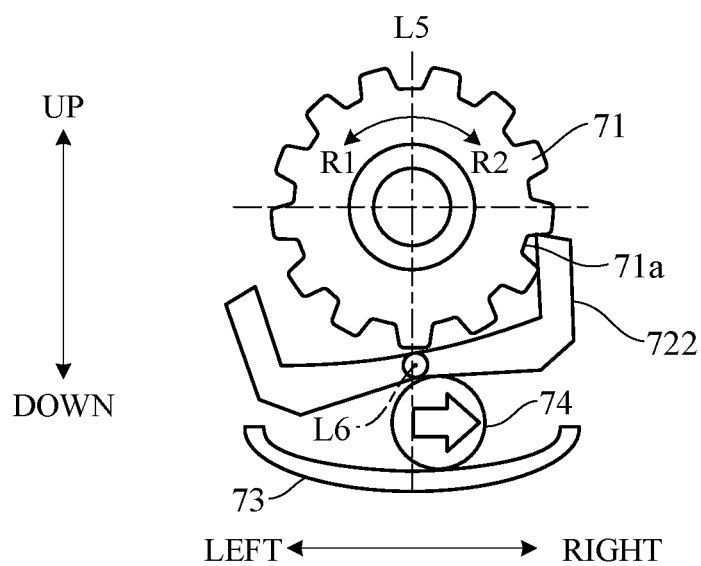
FIG. 16C is a front view illustrating another example of the operation of the restricting portion following FIG. 16A.

On the other hand, from the state of FIG. 16A, when the vehicle 100 travels on a lateral-side slope that is inclined upward to the left or turns to the left, the ball 74 moves to the right side as illustrated in FIG. 16C. Accordingly, the lock member 72 swings leftward about the axial line L6 as a fulcrum, and the upper end portion of the vertical portion 722 on the right side of the lock member 72 is engaged with the groove portion 71a of the rotating body 71. As a result, the rotation of the rotating body 71 in the R2 direction is inhibited, and a rightward swing of the rear vehicle body is inhibited. In this situation, the rotation of the rotating body 71 in the R1 direction is enabled, and a leftward swing of the rear vehicle body is permitted.

In the present embodiment, various modifications are available. Hereinafter, some modified examples will be described. In the above embodiments, the rear vehicle body such as the seat frames 12 and the swing arms 13 supports the rear wheel 2 to be rotatable. However, the configuration of the rear vehicle body as a first member is not limited to this. In the above embodiments, the rear vehicle body is provided to be swingable with respect to the front vehicle body such as the side frames 11. However, the configuration of the front vehicle body as a second member is not limited to this. The second member may rotatably support the front wheels 1. The first member and the second member may have any configuration, as long as they are supported by the coupling member so that the swing amount of the first member is larger than the swing amount of the second member, when swinging in the left-right direction in a state in which the front wheels and the rear wheel are in ground contact with a substantially horizontal ground surface.

In the above embodiments, the rear vehicle body is supported to be swingable with respect to the front vehicle body through the coupling member such as the swing joint 50 and the coupling plate 17. However, the configuration of the coupling member is not limited to the above one, as long as it supports the first member and the second member to be swingable relatively in the left-right direction about an axial line extending in the front-rear direction. Specifically, the coupling member may have any configuration, as long as it is provided so that a first position is closer to the axial line La than a second position, in a case where the first position is set to a position in the left-right direction of an attention point, on the surface of the rear wheel 2, that constitutes the center in a contact area between the rear wheel 2 and the ground surface when the first member swings about the axial line La, and the second position is set to a position in the left-right direction of the attention point before the first member swings about the axial line La.

In the above embodiments, the swing joint 50 is provided so that the post-swing ground contact point P21 (attention point) coincides with the axial line La when the rear vehicle body swings. However, the attention point does not have to coincide with the axial line La, as long as the attention point gets closer to the axial line La after swinging than before swinging. In the above embodiments, the seat 3, the guide 126, and the like are configured to support the user's buttocks or back. However, an occupant support portion may have any configuration, as long as it is coupled with the first member so as to swing integrally with the first member. In the above embodiments, the steps 224 on which the user's feet are placed while the user is riding on the vehicle are provided. However, a placement portion may have any configuration, as long as each of them is provided integrally with the second member to enable the occupant's foot to be placed on.

In the above embodiments (FIGS. 12 to 16C), the restricting portions 60 and 70, which restrict swinging of the rear vehicle body are provided. However, a restricting portion may have any configuration, as long as it restricts relative swinging of the first member and the second member. More specifically, the restricting portion is preferably provided to restrict swinging of the first member in a direction that increases an angle formed by a perpendicular plane extending in a direction orthogonal to the axial line in rotation of the rear wheel 2 and a vertical plane passing through the ground contact point of the rear wheel 2, or to permit swinging of the first member in a direction that reduces such an angle. The restricting portion may be provided to restrict swinging of the first member outward in making a turn, or to permit swinging of the first member inward in making a turn, in the turning radius direction of the vehicle 100. In particular, the restricting portion is preferably provided so as to inhibit the first member from swinging in at least one of a gravity direction and a centrifugal force direction.

In the above embodiments, the rotating bodies 63, 66, and 71, which operate in conjunction with swinging of the rear vehicle body, are configured to be a movable portion (a first engaging element). However, the first engaging element may have any configuration, as long as it operates in conjunction with swinging of the first member. In other words, the first engaging element may be any element other than the rotating body. In the above embodiments (FIGS. 12 to 15), the engaging portions 65 and 67 are respectively configured to include the sprag 651 and the lever 671, which are configured to change the posture between a first posture of engaging with the rotating bodies 63 and 66 and a second posture of disengaging from the rotating bodies 63 and 66.

In the above-described embodiments (FIGS. 16A to 16C), the lock member 72 is configured to be capable of changing the posture between the first posture of engaging with the rotating body 71 and the second posture of disengaging from the rotating body 71. However, the configuration of an engaging portion (a second engaging element) is not limited to the above-described ones. In the above embodiments, the restricting portions 60 and 70 respectively include the balls 654 or 672 and the ball 74 movable in the gravity direction and in the centrifugal force direction. However, it is sufficient if a movable body is configured to be capable of rolling, and the shape of the movable body is not limited to a spherical one. For example, the movable body may have a cylindrical shape.

In the above embodiments, the shaft portion 52 of the swing joint 50 is fixed to the rear vehicle body, and the joint case 51 (a case portion) is fixed to the front vehicle body. However, the shaft portion may be fixed to the front vehicle body, and the case portion may be fixed to the rear vehicle body. In the above embodiments (FIGS. 12 to 15), the rotation of the shaft portion 52 is configured to be transmitted through the circular plate 61 and the rotating body 62, or 621 and 622 to the rotating body 63 or 66 at an increased speed. However, the configuration of the torque transmitting portion is not limited to this. In the above embodiments, the restricting portions 60 and 70 are disposed to be adjacent to the front end surface of the case portion. However, a restricting portion may be disposed to be adjacent to a rear end surface of the case portion, instead of the front end surface. In the above embodiments, the Neidhart damper 55 including the rubber rollers 532 each functioning as a repulsive member, is used for the swing joint 50. However the configuration of a repulsive member that accumulates the repulsive force when the first member and the second member swing relative to each other and that urges swinging in a direction of returning is not limited to the above-described one.

In the embodiment, the vehicle 100 is configured as a three-wheeled vehicle with two front wheels and one rear wheel. The vehicle 100 may have three or more front wheels, or it may have one front wheel and two or more rear wheels. Although in the above embodiment, the vehicle is configured as an electric vehicle with the battery 40, the vehicle 100 may be other than an electric vehicle. In other words, the configuration of a vehicle is not limited to those described above.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LIST 1 front wheel, 2 rear wheel, 11 side frame, 12 seat frame, 13 swing arm, 50 swing joint, 60 restricting portion, 65, 67, engaging portion, 70 restricting portion, 72 lock member, 100 vehicle, P21 post-swing ground contact point, La axial line

The invention claimed is:
1. A vehicle, comprising:
a front wheel;
a rear wheel;
a first member that rotatably supports the rear wheel;

a second member disposed in front of the first member; and a coupling member disposed between the first member and the second member and fixed to each of the first member and the second member so as to support the first member and the second member swingably relative to each other in a left-right direction about an axial line extending in a front-rear direction, wherein the coupling member is provided so that in a case where a ground contact point is set to a center in an area on a surface of the rear wheel in contact with a road surface and the ground contact point after the first member swings about the axial line is defined as a post-swing ground contact point, a position in the left-right direction of the post-swing ground contact point is closer to the axial line than a position in the left-right direction of the post-swing ground contact point before the first member swings.

2. The vehicle according to claim 1, wherein
the coupling member is provided so that the position in the left-right direction of the post-swing ground contact point after the first member swings about the axial line substantially coincides with the axial line.

3. The vehicle according to claim 1, wherein
the coupling member is provided so that an intersection of the axial line and a perpendicular line to the road surface passing through a rotation center of the rear wheel before the first member swings is located to be higher than the road surface.

4. The vehicle according to claim 3, wherein
the coupling member is provided so that the axial line is inclined with a downward gradient toward a rear side.

5. The vehicle according to claim 1, wherein
the coupling member and the first member are provided so that after the first member swings about the axial line, a direction of the rear wheel defined as a direction orthogonal to a rotation shaft of the rear wheel is shifted with respect to the front-rear direction.

6. The vehicle according to claim 1, further comprising
an occupant support portion coupled with the first member so as to swing integrally with the first member to support an occupant's buttock or back.

7. The vehicle according to claim 1, further comprising
a pair of left and right placement portions provided integrally with the second member and extending substantially horizontally between the front wheel and the rear wheel.

8. The vehicle according to claim 7, wherein
rear ends of the pair of left and right placement portions are located behind a front end of the first member.

9. The vehicle according to claim 8, wherein
the pair of left and right placement portions are placed outside the first member in the left-right direction with a gap from the first member so as to avoid contact with the first member when the first member swings.

10. The vehicle according to claim 1, wherein
the axial line extends in the front-rear direction along a center in the left-right direction of the vehicle, and
the front wheel includes two wheels arranged on both sides in the left-right direction of an extension line of the axial line.

11. The vehicle according to claim 10, wherein
the rear wheel includes a single wheel arranged at a center in the left-right direction of the vehicle.

12. The vehicle according to claim 1, wherein
the first member and the second member are supported by the coupling member so that when the first member and the second member swing in the left-right direction in a state that the front wheel and the rear wheel are in contact with a substantially horizontal ground surface, a swing amount of the first member is larger than a swing amount of the second member.

13. The vehicle according to claim 1, further comprising
a restricting portion that restricts swinging relative to each other of the first member and the second member.

14. The vehicle according to claim 13, wherein
the restricting portion is provided so as to restrict the swinging of the first member in a direction increasing an angle formed by a perpendicular plane extending in a direction orthogonal to a rotation axis of the rear wheel and a vertical plane passing through the ground contact point of the rear wheel.

15. The vehicle according to claim 14, wherein
the restricting portion is provided so as to permit the swinging of the first member in a direction reducing the angle.

16. The vehicle according to claim 13, wherein
the restricting portion is provided so as to restrict the swinging of the first member toward a radial outside in turning of the vehicle.

17. The vehicle according to claim 13, wherein
the restricting portion is provided so as to permit the swinging of the first member toward a radial inside in turning of the vehicle.

18. The vehicle according to 13, wherein
the restricting portion is provided so as to inhibit the first member from swinging in at least one of a gravity direction and a centrifugal force direction.

19. The vehicle according to claim 13, wherein
the restricting portion includes a first engaging element and a second engaging element,
the first engaging element is configured to operate in conjunction with the swinging of the first member, and
the second engaging element is configured so that a posture of the second engaging element is changed between a first posture engaging with the first engaging element and a second posture disengaging from the first engaging element.

20. The vehicle according to claim 19, wherein
the restricting portion further includes a movable body provided movably in at least one of a gravity direction and a centrifugal force direction, and
the second engaging element is provided so that the posture of the second engaging element is changed according to a movement of the movable body.

21. The vehicle according to claim 20, wherein
the movable body is configured in a rollable manner, and
the second engaging element is provided so that when the movable body moves to at least one of the gravity direction and the centrifugal force direction, the posture of the second engaging element is changed from the second posture to the first posture.

22. The vehicle according to claim 19, wherein
the coupling member includes
a shaft portion fixed to one of the first member and the second member and extending along the axial line, and
a case portion fixed to the other of the first member and the second member and supporting rotatably the shaft portion about the axial line,
the first engaging element is configured to operate in conjunction with a rotation of the shaft portion about the axial line, and the second engaging element is supported by the case portion.

23. The vehicle according to claim 22, wherein
the first engaging element is a rotating body,
the second engaging element is provided so as to face an outer circumferential surface of the first engaging element, and
the restricting portion further includes a torque transmitting portion transmitting the rotation of the shaft portion to the first engaging element while increasing a rotational speed.

24. The vehicle according to claim 22, wherein
the first engaging element is disposed above the axial line, and
the restricting portion further includes a bracket supporting the second engaging element from an upper surface of the case portion.

25. The vehicle according to claim 22, wherein
the restricting portion is disposed to be adjacent to a front end surface or a rear end surface of the case portion.

26. The vehicle according to claim 1, wherein
the coupling member includes a repulsive member accumulating a repulsive force to urge the first member and the second member toward a return direction of a swinging when the first member and the second member swing relative to each other.

* * * * *